United States Patent
Sasaki

(10) Patent No.: US 7,663,989 B2
(45) Date of Patent: Feb. 16, 2010

(54) METHOD OF SETTING DEFECT MANAGEMENT INFORMATION, METHOD OF RECORDING DATA, COMPUTER PROGRAM PRODUCT, COMPUTER READABLE STORAGE MEDIUM, AND INFORMATION RECORDING APPARATUS THAT PROPERLY RECORDS PLURAL TYPES OF DATA FOR DIFFERENT USES ON THE SAME INFORMATION RECORDING MEDIUM

(75) Inventor: Yoshiyuki Sasaki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 697 days.

(21) Appl. No.: 11/042,210

(22) Filed: Jan. 26, 2005

(65) Prior Publication Data

US 2005/0163010 A1    Jul. 28, 2005

(30) Foreign Application Priority Data

Jan. 27, 2004 (JP) .............................. 2004-017748
Apr. 7, 2004 (JP) .............................. 2004-112644

(51) Int. Cl.
   *G11B 7/00* (2006.01)
(52) U.S. Cl. .................................. 369/47.14; 369/53.17
(58) Field of Classification Search ........................ None
   See application file for complete search history.

(56) References Cited

U.S. PATENT DOCUMENTS

| | | | |
|---|---|---|---|
| 5,237,553 A * | 8/1993 | Fukushima et al. ...... | 369/53.17 |
| 6,353,702 B1 | 3/2002 | Ando et al. | |
| 6,463,021 B2 * | 10/2002 | Nakane et al. ........... | 369/53.15 |
| 6,480,446 B1 | 11/2002 | Ko | |
| 6,621,782 B1 | 9/2003 | Nakane et al. | |
| 6,711,106 B2 | 3/2004 | Sasaki | |
| 7,072,256 B2 | 7/2006 | Ueda et al. | |

(Continued)

FOREIGN PATENT DOCUMENTS

EP         0 952 573           10/1999

(Continued)

OTHER PUBLICATIONS

U.S. Appl. No. 10/932,283, filed Sep. 2, 2004.

(Continued)

*Primary Examiner*—Joseph H Feild
*Assistant Examiner*—Joseph Haley
(74) *Attorney, Agent, or Firm*—Dickstein Shapiro LLP

(57) ABSTRACT

An information recording apparatus that records information on an information recording medium includes a setting mechanism that sets defect management information including information with respect to a specific area in a recording area of the information recording medium in which a defect detection process need not be performed, a recording mechanism that records data in the recording area, and a determining mechanism that determines whether to perform the defect detection process in a recording target area in the recording area in which the data is recorded, based on the defect management information and information with respect to the recording target area. By setting an AV data area as a specific area and by setting a PC data area as a defect management area, the continuity of data recorded in the AV data area is achieved, and the reliability of data recorded in the PC data area is ensured.

27 Claims, 16 Drawing Sheets

U.S. PATENT DOCUMENTS

| | | | |
|---|---|---|---|
| 2001/0043804 A1* | 11/2001 | Nakatani et al. | 386/126 |
| 2002/0114245 A1 | 8/2002 | Sasaki | |
| 2002/0159353 A1 | 10/2002 | Sasaki | |
| 2003/0033475 A1 | 2/2003 | Sasaki | |
| 2003/0133369 A1 | 7/2003 | Sasaki | |
| 2003/0135800 A1 | 7/2003 | Kim et al. | |
| 2003/0163638 A1 | 8/2003 | Sasaki | |
| 2003/0223338 A1 | 12/2003 | Sasaki | |
| 2003/0237024 A1* | 12/2003 | Ogawa et al. | 714/29 |
| 2004/0057366 A1 | 3/2004 | Sasaki | |
| 2004/0090886 A1 | 5/2004 | Sasaki | |
| 2004/0133739 A1 | 7/2004 | Sasaki | |
| 2004/0160875 A1 | 8/2004 | Sasaki | |
| 2004/0165499 A1 | 8/2004 | Sasaki | |
| 2004/0213117 A1 | 10/2004 | Sasaki | |

FOREIGN PATENT DOCUMENTS

| | | |
|---|---|---|
| EP | 0 952 573 A2 | 10/1999 |
| EP | 1 100 087 A2 | 5/2001 |
| EP | 1 253 590 A2 | 10/2002 |
| JP | 2000-003562 | 1/2000 |
| JP | 2000-032378 | 1/2000 |
| JP | 2000-048491 | 2/2000 |
| JP | 2001-325773 | 11/2001 |

OTHER PUBLICATIONS

U.S. Appl. No. 10/935,555, filed Sep. 8, 2004.
U.S. Appl. No. 10/945,461, filed Sep. 2, 2004.
U.S. Appl. No. 10/934,730, filed Sep. 7, 2004.
Chinese Office Action and English translation (12 pages).

* cited by examiner

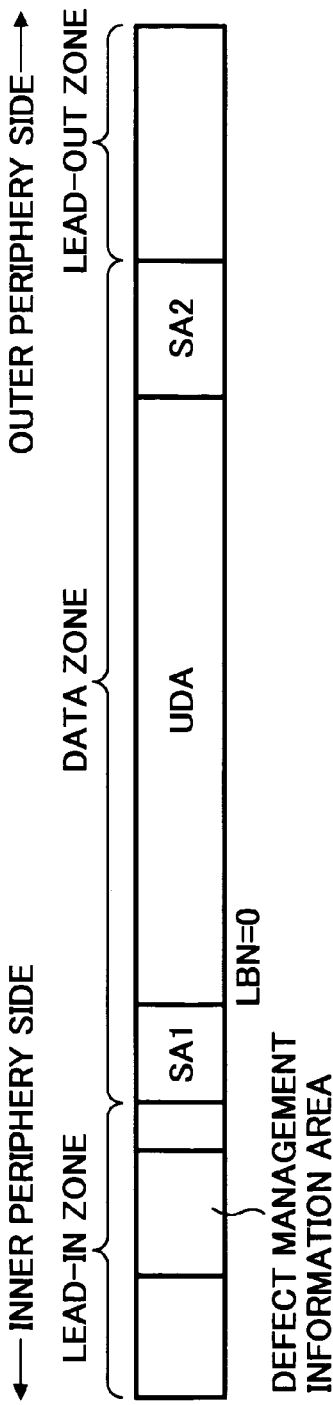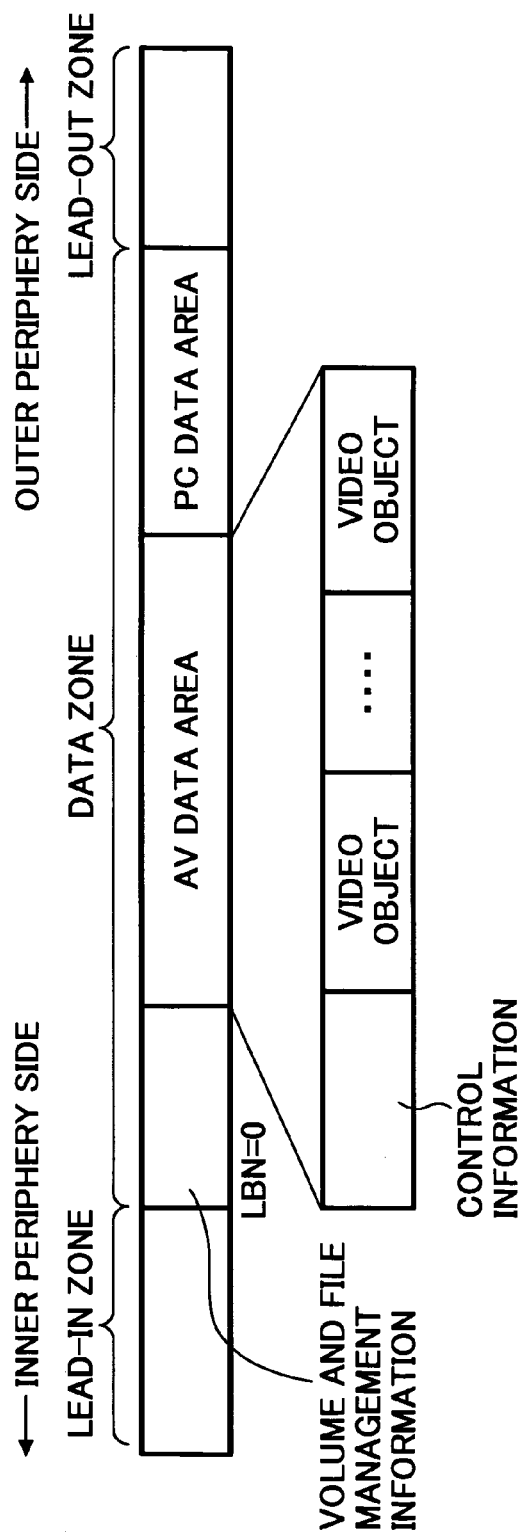

| CONTENTS | LENGTH IN BYTES |
|---|---|
| ID (IDENTIFICATION) | 3 |
| VERSION NUMBER | 1 |
| UPDATE COUNT | 4 |
| SIZE OF UDA | 4 |
| SIZE OF SA1 | 2 |
| SIZE OF SA2 | 2 |
| DISK STATUS | 1 |
| LAST WRITTEN ADDRESS (LWA) POINTER | 4 |
| LAST VERIFIED ADDRESS (LVA) POINTER | 4 |
| REPLACEMENT DISABLED AREA END ADDRESS (RDAEA) POINTER | 4 |
| NUMBER OF REPLACEMENT LIST | 2 |
| FIRST REPLACEMENT LIST | 6 |
| ... | ... |
| N-TH REPLACEMENT LIST | 6 |
| RESERVED | |

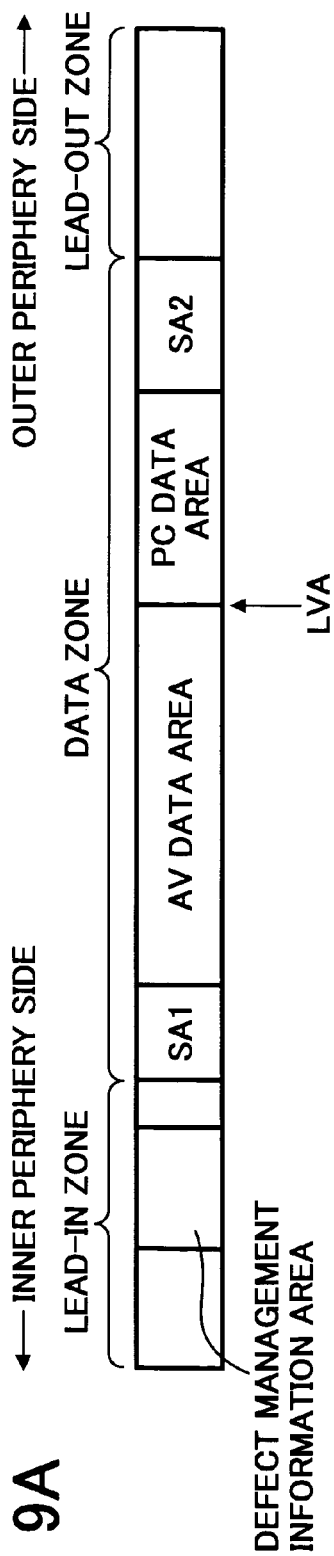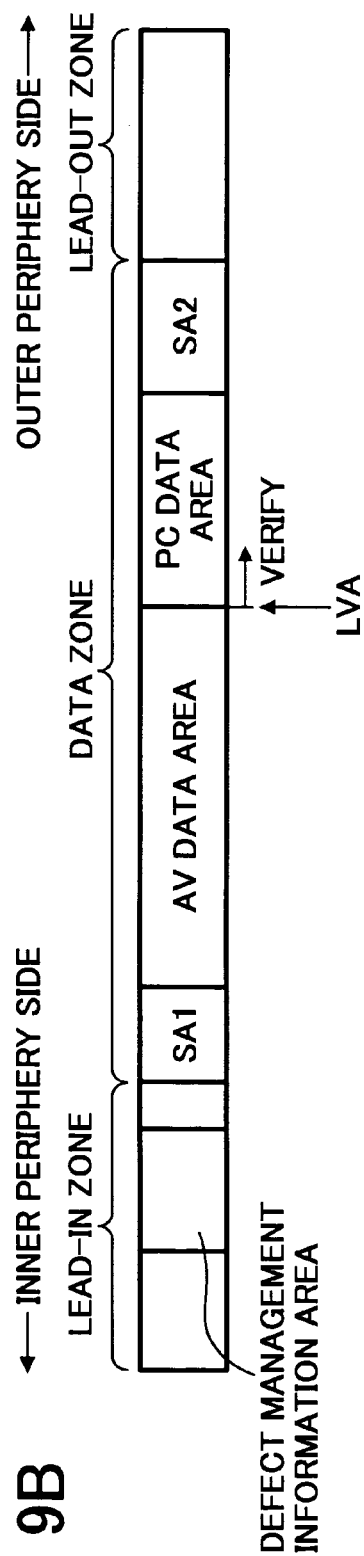

METHOD OF SETTING DEFECT MANAGEMENT INFORMATION, METHOD OF RECORDING DATA, COMPUTER PROGRAM PRODUCT, COMPUTER READABLE STORAGE MEDIUM, AND INFORMATION RECORDING APPARATUS THAT PROPERLY RECORDS PLURAL TYPES OF DATA FOR DIFFERENT USES ON THE SAME INFORMATION RECORDING MEDIUM

CROSS-REFERENCE TO RELATED APPLICATIONS

This application claims priority to Japanese Patent Application No. 2004-017748 filed in the Japanese Patent Office on Jan. 27, 2004, and Japanese Patent Application No. 2004-112644 filed in the Japanese Patent Office on Apr. 7, 2004, the entire contents of which are incorporated by reference herein.

BACKGROUND OF THE INVENTION

1. Field of the Invention

The present invention relates to a method of setting defect management information, a method of recording data, a computer program product, a computer readable storage medium, and an information recording apparatus. Particularly, the present invention relates to a method of setting defect management information used for managing a defective area in a recording area of an information recording medium, a method of recording data on an information recording medium, a computer program product implemented in an information recording apparatus, a computer readable storage medium storing such a computer program, and an information recording apparatus that records information on an information recording medium.

2. Discussion of the Related Art

As the performance of a personal computer ("PC") has rapidly improved and the price of the PC has been lower, the PC is widely used for document creation, table calculation, and data management using databases. As an information recording medium used for recording data created by a PC and data used in a PC ("PC data"), an optical disk such as a compact disk (CD), and a digital versatile disk (DVD) capable of recording data of about 7 times as much as the CD on a disk of the same diameter as the CD, comes to attract attention. Further, an optical disk apparatus functioning as an information recording apparatus for recording information on an optical disk is becoming widespread.

In the case of using a rewritable optical disk, a defect management function is provided to ensure the reliability of recorded data. In the defect management function, a list which relates a defective area of an optical disk to its replacement area is recorded in a predetermined area of the optical disk. When recording data on and reproducing data from an optical disk, the use of the defective area can be prevented by referring to the list.

Generally, the defective area of an optical disk is detected through a so-called verification process in which a predetermined data pattern (dummy data) is recorded in a recording area of an optical disk during a formatting process of the optical disk, after which the dummy data recorded in the recording area is reproduced to obtain an error rate, for example.

Further, a so-called background formatting method is employed. In the background formatting method, recording and reproducing operations are prioritized, so that when a recording request or a reproduction request is received from a host apparatus during a formatting process, the formatting process is interrupted to perform the requested recording or reproducing operation. The formatting process is resumed after the recording or reproducing operation is completed. In this way, a user can record data on and reproduce data from an optical disk even when the formatting process on the optical disk is incomplete.

In the above-described background formatting method, data may be already recorded before the verification process is performed. Thus, when data is recorded in an area on which the verification process has not yet been performed, the verification process may be performed on this area after the recording of data, and a determination may be made as to whether the data can be properly reproduced.

With the advancement of digital technology and data compression technology, it has become possible to record AV (Audio-Visual) data such as music, and images, on an optical disk. Generally, the reliability of AV data is not so important as compared to PC data, because minor errors in AV data do not usually translate into errors in the resultant audio or video which can be detected by a person with ordinary sensory ability. Rather, it is more important that the recording of AV data can be prevented from being interrupted, that is, AV data can be recorded consecutively. For this reason, when recording AV data on an optical disk, the defect management for managing a defective area in a recording area of an optical disk is not performed.

Because what is requested by user is different between PC data and AV data when recording PC data and AV data on an optical disk, PC data and AV data are separately recorded on different optical disks as described in Japanese Laid-Open Patent Application No. 2000-48491, for example.

In another background technique, AV data and PC data are recorded on the same optical disk as described in Japanese Laid-Open Patent Application No. 2000-32378, for example. Specifically, an AV data area and a PC data area are provided in a recording area of an optical disk, and AV data and PC data are recorded in the AV data area and the PC data area, respectively In an optical disk in which both AV data and PC data are recorded, for example, AV data can be reproduced when the optical disk is set in a reproducing environment (e.g., a DVD player) in which AV data can be reproduced, and both AV data and PC data can be reproduced when the optical disk is set in an optical disk apparatus connected to a PC.

In a background technique, when recording AV data on an optical disk in which both AV data and PC data can be recorded, a defect management is not performed in a recording area of the optical disk. In this case, even if a PC data area in the recording area includes a defective area and a PC data recording target area in the PC data area includes a defective area, PC data is recorded in the PC data recording target area without preventing from recording the PC data in the defective area. Consequently, the reliability of the PC data may be degraded.

Therefore, it is desirable to provide a method of setting defect management information that can properly record plural types of data for different uses on the same information recording medium.

Further, it is desirable to provide a method of recording data and an information recording apparatus that can properly record plural types of data for different uses on the same information recording medium.

Moreover, it is desirable to provide a computer program product that is implemented in the information recording apparatus and is capable of properly recording plural types of data for different uses on the same information recording medium, and to provide a computer readable storage medium storing such a computer program product.

SUMMARY OF THE INVENTION

According to an aspect of the present invention, a method of setting defect management information used for managing a defective area in a recording area of an information recording medium, includes steps of obtaining information with respect to a specific area in the recording area in which a defect detection process for detecting the defective area in the recording area need not be performed, and setting defect management information including the information with respect to the specific area.

According to another aspect of the present invention, a method of recording data in a recording area of an information recording medium, includes steps of obtaining information with respect to a specific area in the recording area in which a defect detection process for detecting a defective area in the recording area need not be performed, setting defect management information that is used for managing the defective area in the recording area and that includes the information with respect to the specific area, obtaining information with respect to a recording target area in the recording area in which data is recorded, and determining whether to perform the defect detection process in the recording target area based on the defect management information and the information with respect to the recording target area. According to another aspect of the present invention, a computer program product is implemented in an information recording apparatus that records data in a recording area of an information recording medium to carry out a method including steps of obtaining information with respect to a specific area in the recording area in which a defect detection process for detecting a defective area in the recording area need not be performed, and setting defect management information that is used for managing the defective area in the recording area and that includes the information with respect to the specific area.

According to yet another aspect of the present invention, a computer readable storage medium stores a computer program product that is implemented in an information recording apparatus that records data in a recording area of an information recording medium to carry out a method including steps of obtaining information with respect to a specific area in the recording area in which a defect detection process for detecting a defective area in the recording area need not be performed, and setting defect management information that is used for managing the defective area in the recording area and that includes the information with respect to the specific area.

According to yet another aspect of the present invention, an information recording apparatus that records information on an information recording medium includes a setting mechanism configured to set defect management information including information with respect to a specific area in a recording area of the information recording medium in which a defect detection process for detecting a defective area in the recording area need not be performed, a recording mechanism configured to record data in the recording area, and a determining mechanism configured to determine whether to perform the defect detection process in a recording target area in the recording area in which the data is recorded, based on the defect management information and information with respect to the recording target area.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 2 is a diagram showing a disk layout of a recording area of an optical disk on which a background defect management is performed;

FIG. 3 is a diagram showing a disk layout of a recording area of an optical disk in which both AV data and PC data are recorded;

FIGS. 9A and 9B are diagrams of the recording area of the optical disk for explaining a background formatting process according to the another embodiment of the present invention.

DESCRIPTION OF THE PREFERRED EMBODIMENTS

Figure 1:
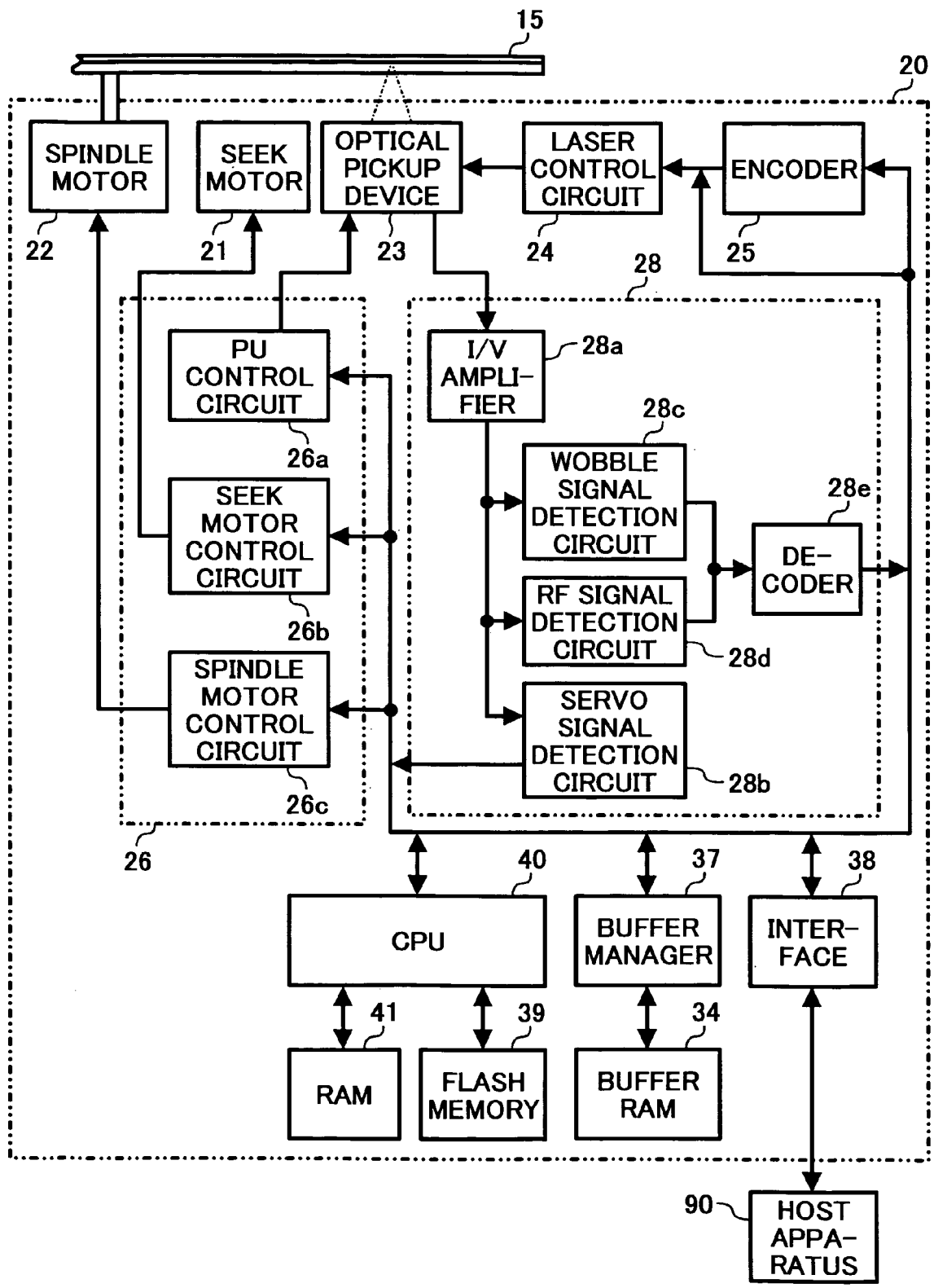
FIG. 1 is a block diagram of a configuration of an optical disk apparatus according to an embodiment of the present invention.

Preferred embodiments of the present invention are described in detail referring to FIGS. 1 through 9D, wherein like reference numerals designate identical or corresponding parts throughout the several views.

FIG. 1 is a block diagram of a configuration of an optical disk apparatus 20 functioning as an information recording apparatus according to an embodiment of the present invention.

The optical disk apparatus 20 shown in FIG. 1 includes a seek motor 21, a spindle motor 22, an optical pickup unit 23, a laser control circuit 24, an encoder 25, a servo control circuit 26, a reproduction signal processing circuit 28, a buffer RAM 34, a buffer manager 37, an interface 38, a flash memory 39, a CPU 40, and a RAM 41. It is noted that the arrows and connection lines indicated in FIG. 1 are merely representative lines for illustrating the overall flow of signals and information and do not represent the entire connection relation between the blocks.

The seek motor 21 drives the optical pickup unit 23 to move in a sledge direction relative to the radius of the optical disk. The spindle motor 22 drives an optical disk 15 functioning as an information recording medium to rotate.

The optical pickup unit 23 is configured to irradiate a laser light beam onto a recording surface of the optical disk 15 on which spiral or concentric tracks (i.e., recording areas) are formed, and to receive reflected light from the recording surface. The optical pickup unit 23 includes a semiconductor laser (not shown) functioning as a light source, and an objective lens (not shown) that directs a laser light beam emitted from the semiconductor laser to the recording surface of the optical disk 15. The optical pickup unit 23 further includes an optical system (not shown) that directs the laser light beam reflected from the recording surface of the optical disk 15 to a predetermined light receiving position. Moreover, the optical pickup unit 23 includes a photo detector (not shown) which is disposed at the light receiving position to receive the laser light beam reflected from the recording surface of the optical disk 15, and a drive system (not shown) such as a focusing actuator and a tracking actuator. The photo detector generates a current signal according to the amount of received light by carrying out a photoelectric transformation, and outputs the current signal to the reproduction signal processing circuit 28.

The reproduction signal processing circuit 28 includes an I/V amplifier 28a, a servo signal detection circuit 28b, a wobble signal detection circuit 28c, an RF signal detection circuit 28d, and a decoder 28e.

The I/V amplifier 28a converts a current signal corresponding to an output signal of the photo detector in the optical pickup unit 23 into a voltage signal. The voltage signal is amplified with a predetermined gain. The servo signal detection circuit 28b detects a servo signal such as a focus error signal, and track error signal, from the output signal of the I/V amplifier 28a. The servo signal detected herein is output to the servo control circuit 26.

The wobble signal detection circuit 28c detects a wobble signal from the output signal of the I/V amplifier 28a. The RF signal detection circuit 28d detects an RF signal from the output signal of the I/V amplifier 28a.

The decoder 28e extracts data, such as address information, and a synchronization signal, from the wobble signal detected by the wobble signal detection circuit 28c. The extracted address information is output to the CPU 40, and the synchronization signal is output to the encoder 25. The decoder 28e performs processes such as demodulation and error correction processes, on the RF signal detected by the RF signal detection circuit 28d, and stores the resulting data as reproduction data in the buffer RAM 34 via the buffer manager 37.

The servo control circuit 26 includes a PU (optical pickup unit) control circuit 26a, a seek motor control circuit 26b, and a spindle motor control circuit 26c. The PU control circuit 26a generates a drive signal for driving the focusing actuator to correct a focus deviation of the objective lens of the optical pickup unit 23 based on the focus error signal from the servo signal detection circuit 28b, and outputs the drive signal to the optical pickup unit 23. Further, the PU control circuit 26a generates a drive signal for driving the tracking actuator to correct a track deviation of the objective lens based on the track error signal from the servo signal detection circuit 28b, and outputs the drive signal to the optical pickup unit 23. Thereby, tracking control and focus control are performed.

The seek motor control circuit 26b generates a drive signal for driving the seek motor 21 based on an instruction from the CPU 40, and outputs the drive signal to the seek motor 21.

The spindle motor control circuit 26c generates a drive signal for driving the spindle motor 22 based on an instruction from the CPU 40, and outputs the drive signal to the spindle motor 22.

The buffer RAM 34 includes a buffer area and a variable area. The buffer area temporarily stores data to be recorded on the optical disk 15 and data reproduced from the optical disk 15. The variable area stores variables of various types of programs. The buffer manager 37 manages input and output data to/from the buffer RAM 34.

The encoder 25 extracts data to be recorded which is stored in the buffer RAM 34 via the buffer manager 37 based on an instruction from the CPU 40, performs processes such as data demodulation and attachment of an error correction code, and generates a write signal to be written on the optical disk 15. The write signal generated by the encoder 25 is output to the laser control circuit 24.

The laser control circuit 24 controls the power of a laser light beam emitted from the semiconductor laser of the optical pickup unit 23 onto the optical disk 15. When recording data on the optical disk 15, the laser control circuit 24 generates a drive signal for the semiconductor laser based on recording conditions, the light-emitting characteristic of the semiconductor laser, and the write signal from the encoder 25.

The interface 38 corresponds to a bidirectional communication interface with a host apparatus 90 such as a personal computer, and may be a standard interface conforming to AT Attachment Packet Interface (ATAPI) and Small Computer System Interface (SCSI), for example.

The flash memory 39 includes a program area and a data area. The program area stores a program which is described in code readable by the CPU 40. The data area stores information such as the light-emitting characteristic of the semiconductor laser, and recording conditions.

The CPU 40 controls operations in each of the blocks according to the program stored in the program area of the flash memory 39, and stores data necessary for controlling the blocks in the variable area of the buffer RAM 34 and in the RAM 41.

The disk layout of a recording area of an optical disk on which a background defect management is performed will be described referring to FIG. 2. In the optical disk on which the background defect management is performed, as a non-limiting example, the recording area is divided into three areas, that is, a lead-in zone, a data zone, and a lead-out zone, from the inner periphery towards the outer periphery of the optical disk. The lead-in zone includes a defect management information area in which defect management information is recorded.

Data is recorded on and reproduced from the data zone. An absolute address as a physical address is allocated to each sector of the data zone. The data zone is divided into a first spare area (SA1), a user data area (UDA), and a second spare area (SA2). The UDA is used for storing user data therein. A logical address is allocated to each sector included in the UDA. A user accesses the optical disk by use of the logical address and requests for recording data on and reproducing data from the optical disk. The SA1 and SA2 each correspond to replacement areas for defective areas of the UDA.

FIG. 3 shows another example of a disk layout of a recording area of an optical disk in which both AV data and PC data are recorded. As shown in FIG. 3, the recording area is divided into three areas, that is, a lead-in zone, a data zone, and a lead-out zone, from the inner periphery towards the outer periphery of the optical disk. The data zone is divided into three areas: (1) a volume and file management information area in which file management information is stored; (2) an AV data area in which AV data is stored; and (3) a PC data area in which data other than AV data is stored. The AV data area includes an are in which control information with respect to video object is stored, and an area in which video object is stored.

Figures 4A, 4B:
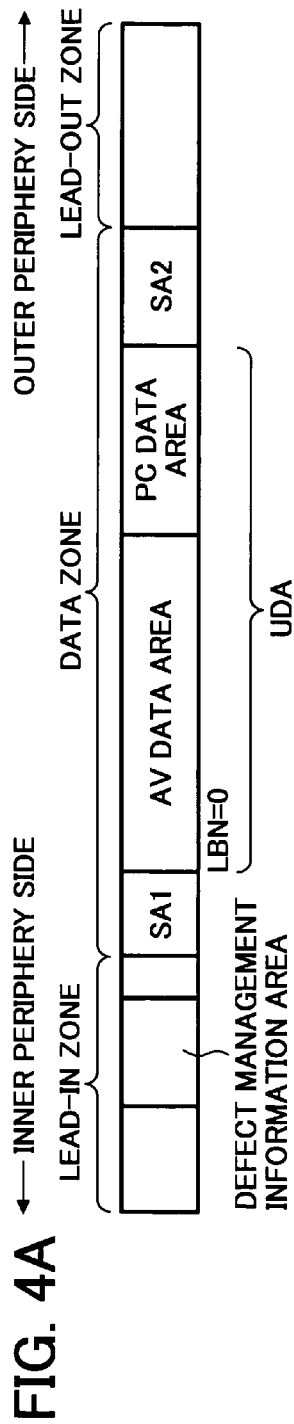
FIG. 4A is a diagram showing a disk layout of a recording area of an optical disk according to an embodiment of the present invention.
FIG. 4B is a table showing a data structure of defect management information stored in a defect management information area of the optical disk of FIG. 4A.

FIG. 4A shows a disk layout of a recording area of the optical disk 15 according to an embodiment of the present invention. As shown in FIG. 4A, the recording area of the optical disk 15 is divided into three areas, that is, a lead-in zone, a data zone, and a lead-out zone, from the inner periphery towards the outer periphery of the optical disk 15.

The lead-in zone includes a defect management information area, and the data zone includes a SA1, a UDA, and a SA2. The UDA is divided into an AV data area and a PC data area. In the AV data area, file management information with respect to AV data and PC data, and AV data are stored. In the PC data area, PC data is stored. In this embodiment, as a nonlimiting example, the AV data area is provided at the inner periphery side of the PC data area. The boundary between the AV data area and the PC data area can be arbitrarily set by a user.

In the defect management information area of the lead-in zone, defect management information is stored. FIG. 4B is a table showing a data structure of defect management information stored in the defect management information area. As shown in FIG. 4B, the defect management information includes "ID (identification)", "Version number", "Update count", "Size of UDA", "Size of SA1", "Size of SA2", "Disk status", "Last written address (LWA) pointer", "Last verified address (LVA) pointer", "Replacement disabled area end address (RDAEA) pointer", "Number of replacement list", and "First replacement list" to "N-th replacement list".

In the "ID", the identification information which indicates that information is defect management information is stored. In the "Version number", the version number of defect management information is stored. In the "Update count", the count of update, that is, record, of defect management information is stored. In the "Size of UDA", the size of UDA is stored. In the "Size of SA1", the size of SA1 is stored. In the "Size of SA2", the size of SA2 is stored. In the "Disk status", information with respect to the condition of a background formatting process such as formatting status, and verification status, is stored. Specifically, in the formatting status, information whether the recording of dummy data (it is called a "de-ice process") is completed is stored. In the verification status, information whether a verification process is in execution is stored. These information is referred to when the background formatting process is resumed.

In the "Last written address (LWA) pointer", pointer information indicating a last address in dummy data recorded in the background formatting process is stored. The LWA pointer is referred to when the de-ice process is resumed, and the de-ice process resumes from the address that follows the address pointed by the LWA pointer. In the "Last verified address (LVA) pointer", pointer information indicating an address where a last verification process is completed in the background formatting process, is stored. The LVA pointer is referred to when the verification process is resumed, and the verification process resumes from the address that follows the address pointed by the LVA pointer.

In this embodiment, pointer information indicating a last address of an area in the UDA where defect detection is not performed, is stored in the "Replacement disabled area end address (RDAEA) pointer". Specifically, defect management is not performed in an area ranging from the start address of the UDA to an address pointed by the RDAEA pointer. If the RDAEA pointer is 0, defect management is performed in an entire area of the UDA. The RDAEA pointer can be arbitrarily set by a user.

In the "Number of replacement list", the number of replacement list stored in a replacement list table, is stored. Here, it is assumed that "N" number of replacement lists exist. In each of the "First replacement list" to the "N-th replacement list", a correspondence of an address of a defective block to an address of a replacement block is stored.

Generally, when an optical disk is inserted into an optical disk apparatus, the above-described defect management information stored in a defect management information area of the optical disk is read out and duplicated, and the duplicated defect management information is stored in a RAM of the optical disk apparatus. The defect management information stored in the RAM is referred to and updated in a defect management process. Before ejecting the optical disk from the optical disk apparatus, the updated defect management information in the RAM is written in the defect management information area of the optical disk.

FIGS. 5A through 5D are flowcharts of process operation steps of the CPU 40 according to an embodiment of the present invention. A process operation of the optical disk apparatus 20 will be described referring to FIGS. 5A through 5D. This process operation is performed upon receiving a formatting command requesting formatting of a blank optical disk from the host apparatus 90. The process operation steps shown in these flowcharts correspond to a sequence of process algorithms of a process program executed by the CPU 40. Upon receiving a formatting command to format a blank disk from the host apparatus 90, a leading address of a process program corresponding to the flowcharts of FIGS. 5A through 5D is set to a program counter of the CPU 40, and the process operation starts. In this embodiment, it is assumed that the optical disk 15 is a blank disk. Further, it is assumed that an ejection request and a formatting termination request are not issued during the process, and all the user data can be stored in the buffer RAM 34.

Figure 5A:
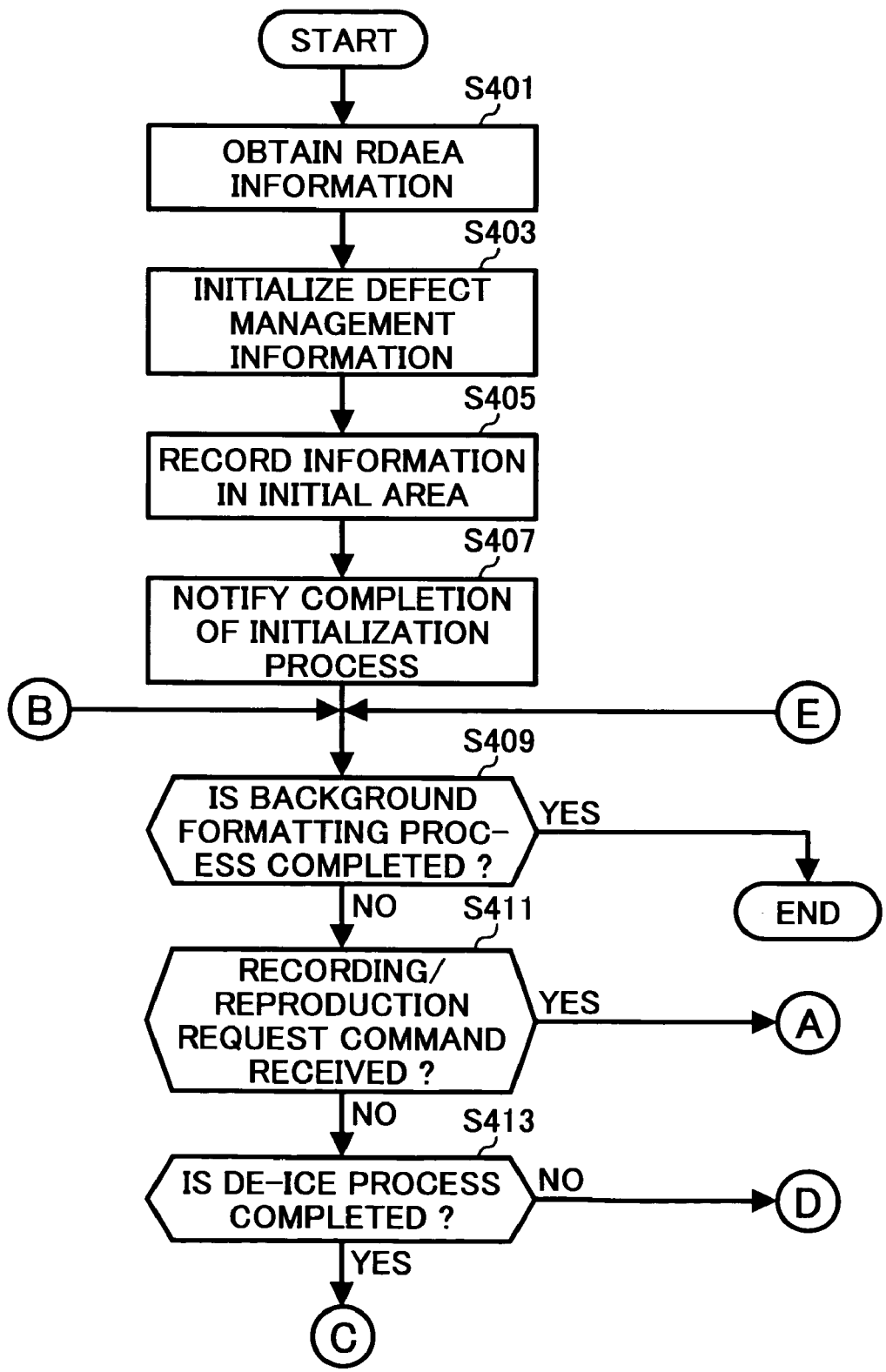
FIGS. 5A through 5D are flowcharts of process operation steps of a CPU according to an embodiment of the present invention, which is performed upon receiving a formatting command requesting formatting of the optical disk from a host apparatus.
Figure 6A:
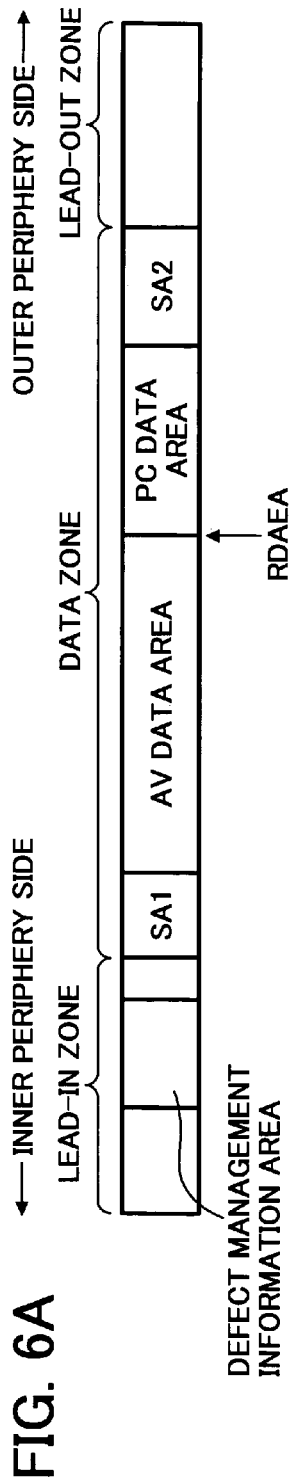
FIGS. 6A through 6E are diagrams of the recording area of the optical disk for explaining a background formatting process according to the embodiment of the present invention.

In step S401 of FIG. 5A, the CPU 40 obtains information with respect to the Replacement disabled area end address (RDAEA) set by a user through the host apparatus 90. Here, as a non-limiting example, the boundary between the AV data area and the PC data area has been set by a user as the information with respect to the RDAEA. Therefore, as shown in FIG. 6A, the last address of the AV data area becomes RDAEA, and the AV data area becomes a specific area in which a defect detection process for detecting a defective area is not performed.

Next, in step S403, the CPU 40 sets a pointer indicating the RDAEA obtained in step S401 to the RDAEA pointer (FIG. 4B) in the defect management information, and initializes the defect management information. The initialized defect management information is stored in a predetermined area reserved in the RAM 41.

Next, in step S405, the CPU 40 performs an initialization process in which it records predetermined information in an initial area (not shown) including the defect management information area in the lead-in zone. At this time, the CPU 40 records the initialized defect management information on the optical disk 15.

Then, in step S407, the CPU 40 notifies the host apparatus 90 of the completion of the initialization process. Then, the CPU 40 sets each of a recording request flag and a reproduction request flag to 0 (zero). After the completion of the initialization process, reception of a recording request and a reproduction request is allowed. In this embodiment, communications with the host apparatus 90, that is, transmission and reception of data to/from the host apparatus 90 are achieved by interruption processes. Thus, when a command requesting a recording (recording request command) is received from the host apparatus 90, the recording request flag is set to "1" by an interruption process. When a command requesting a reproduction (reproducing request command) is received from the host apparatus 90, the reproducing request flag is set to "1" by an interruption process.

Next, the CPU 40 refers to the "Disk status" and determines whether a background formatting process is completed in step S409. Because a background formatting process is not completed, the answer in step S409 becomes NO. Then, the CPU 40 determines whether a recording request command or a reproduction request command has been received from the host apparatus 90 by referring to the recording request flag and the reproduction request flag in step S411. If each of the recording request flag and the reproduction request flag is set to "0", the answer in step S411 becomes NO, and the process operation proceeds to step S413.

Next, in step S413, the CPU 40 determines whether a de-ice process is completed by referring to a formatting status included in the "Disk status". Because the de-ice process has not yet been performed, the answer in step S413 becomes NO, and the process operation proceeds to step S415.

In step S415, the CPU 40 determines whether the de-ice process is in execution. Because the de-ice process has not yet been started, the answer in step S415 becomes NO. Then, the CPU 40 obtains a Last written address (LWA) in step S417.

Figure 6B:
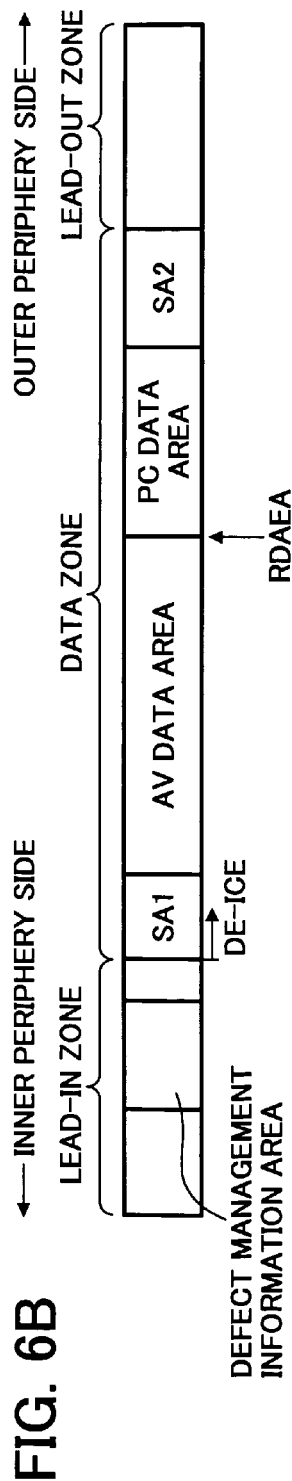

Next, in step S419, the de-ice process is started from an address that follows the LWA obtained in step S417. As shown in FIG. 6B, for example, the de-ice process is started from the leading address of the data zone. Then, the process operation returns to step S409.

If the de-ice process is in execution in step S415 (i.e., the answer is YES in step S415), the process operation returns to step S409.

Until the answer in step S411 and the answer in step S413 become YES, the de-ice process is continued. The de-ice process is skipped in an area in which data is already recorded. When the de-ice process is completed, information with respect to the completion of the de-ice process is set in the formatting status by an interruption process, for example.

Figure 5B:
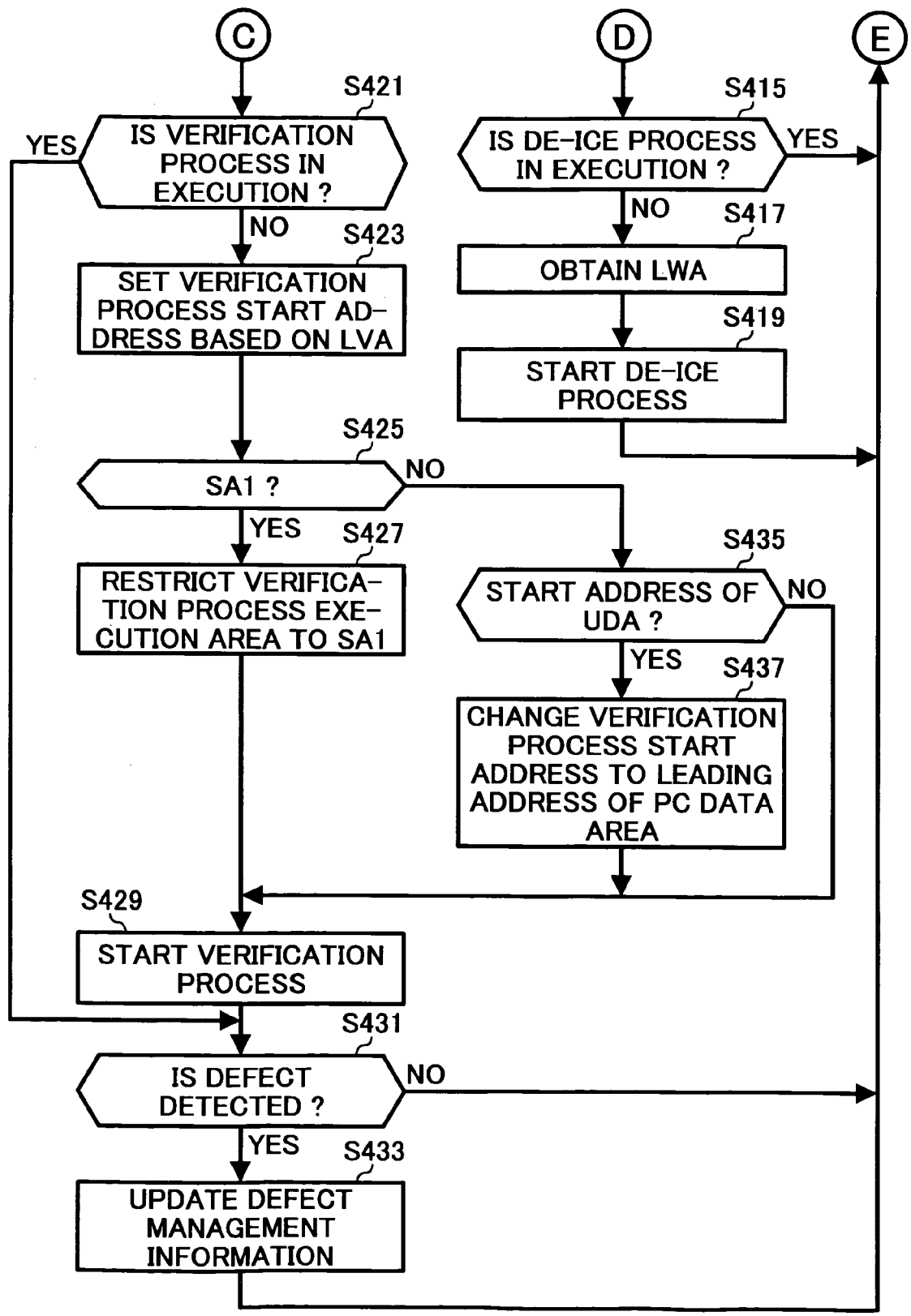

When the de-ice process is completed in step S413 (i.e., the answer is YES in step S413), the CPU 40 determines whether a verification process is in execution in step S421 in FIG. 5B. Because the verification process has not yet been started, the answer in step S421 becomes NO.

Figure 6C:
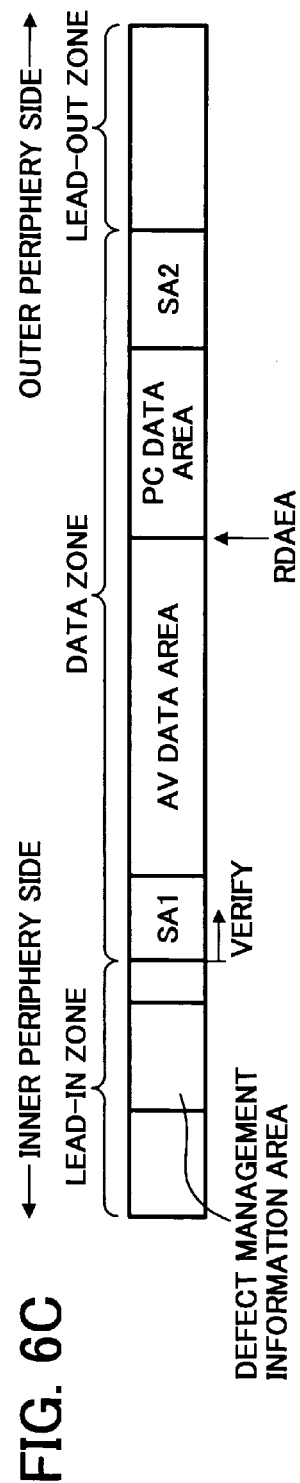

Next, in step S423, the CPU 40 obtains a Last verified address (LVA), and sets an address that follows the obtained LVA as a start address for starting the verification process ("verification start address"). As shown in FIG. 6C, for example, the leading address of the SA1 is set as the verification start address, and the verification process is started from the leading address of the SA1.

In step S425, the CPU 40 determines whether an area to be subjected to the verification process is the SA1. Because the verification start address is the leading address of the SA1, the answer in step S425 becomes YES, and the process operation proceeds to step S427.

In step S427, the CPU 40 restricts the area to be subjected to the verification process (verification process execution area) to the SA1. That is, the last address of the SA1 is set as an end address of the verification process ("verification end address"). Next, the CPU 40 starts the verification process in step S429.

Then, in step S431, the CPU 40 determines whether a defect is detected based on the result of the verification process. If defect is not detected in step S431 (i.e., the answer is NO in step S431), the process operation returns to step S409.

If defect is detected in step S431 (i.e., the answer is YES in step S431), the process operation proceeds to step S433.

In step S433, the CPU 40 adds information with respect to the defect detected in step S431 to the replacement list (FIG. 4B), and updates the defect management information. Then, the process operation returns to step S409.

Until the recording request command or the reproduction request command has been received from the host apparatus 90 in step S411 (i.e., the answer becomes YES in step S411), the verification process for the SA1 is continued. During the execution of the verification process, the answer in step S421 becomes YES, and the process operation proceeds to step S431. When the verification process for the SA1 is completed, the answer in step S425 becomes NO, and the process operation proceeds to S435.

In step S435, the CPU 40 determines whether the address where the last verification process is completed coincides with the start address of the user data area (UDA). As it is immediately after the verification process for the SA1 has been completed, the answer in step S435 becomes YES, and the process operation proceeds to S437.

Figure 6D:
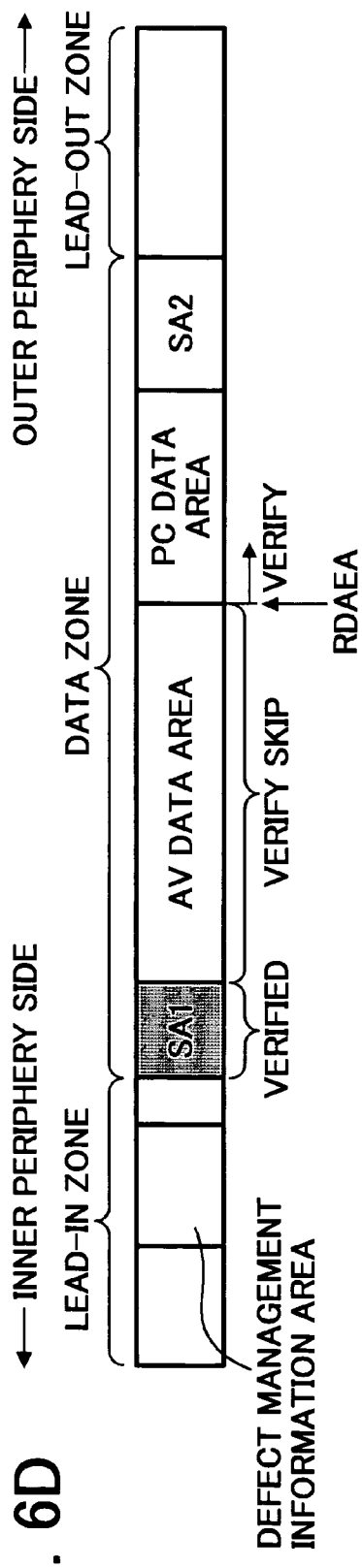

In step S437, the CPU 40 refers to the RDAEA pointer, and changes the verification start address to an address that follows the address indicated by the RDAEA pointer. As shown in FIG. 6D, for example, the leading address of the PC data area becomes the verification start address. Thereby, the verification process for the AV data area is skipped. It is set that the verification end address becomes the last address of the data zone, that is, the last address of the SA2. Then, the process operation proceeds to step S429.

Figure 6E:
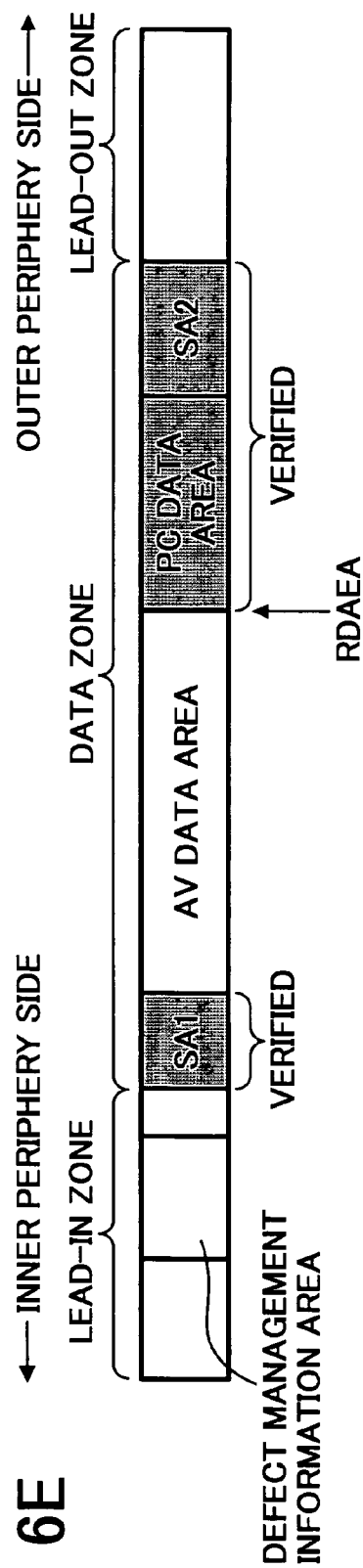

Until the answer in step S409 or step S411 becomes YES, the verification process is continued. Hereafter, the answer in step S435 becomes NO, and the process operation proceeds to step S429. As shown in FIG. 6E, for example, when the verification process is completed at the last address of the SA2, information with respect to the completion of the background formatting process is set in the "Disk status" by an interruption process.

Figure 5C:
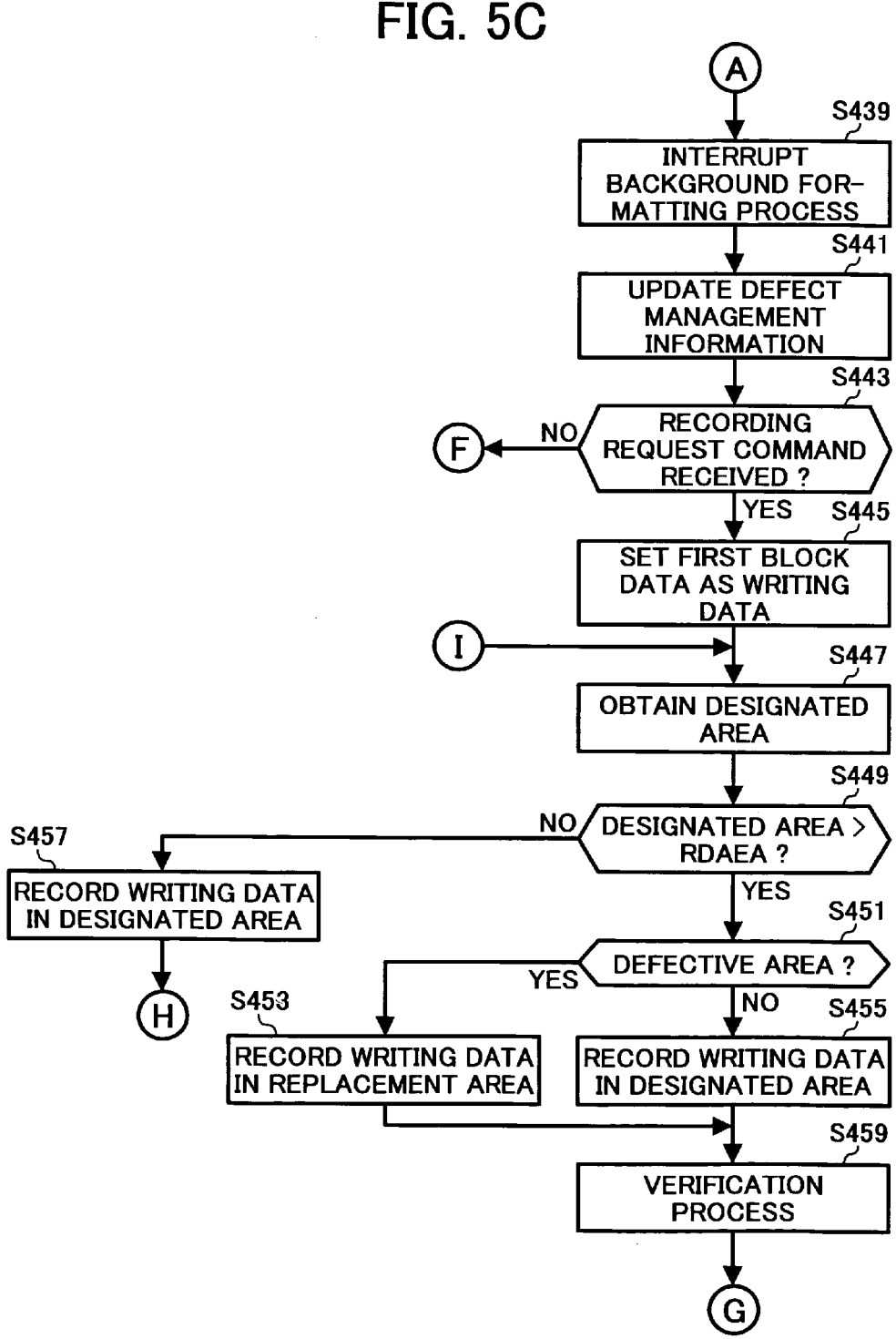

If at least one of the recording request flag and the reproduction request flag is set to "1" in step S411, the answer becomes YES in step S411, and the process operation proceeds to step S439 in FIG. 5C. In step S439, the background formatting process is interrupted.

Next, in step S441, the CPU 40 updates the content of the defect management information. For example, if the de-ice process is in execution, the pointer indicating the last address of an area in which the de-ice process has been completed is stored in the "LWA pointer". If the verification process is in execution, the pointer indicating the last address of an area in which the verification process has been completed is stored in the "LVA pointer".

Next, in step S443, the CPU 40 determines whether a recording request command has been received from the host apparatus 90 by referring to the recording request flag. If the recording request flag is set to "1", the answer becomes YES in step S443, and the process operation proceeds to step S445. It is assumed that user data is transmitted from the host apparatus 90 following the recording request command, and is stored in the buffer RAM 34 as data to be recorded.

Next, in step S445, the CPU 40 sets the first block data of the data to be recorded as writing data. Then, the CPU 40 selects a "designated area" where the writing data is to be recorded based on a recording start address included in the recording request command in step S447. In other words, the designated area means a recording target area.

Next, in step S449, the CPU 40 determines whether the designated area is included in a defect management area in which defect management is performed by referring to the RDAEA pointer. Specifically, the CPU 40 compares the address of the designated area with an address indicated by the RDAEA pointer. If the address of the designated area is greater than the address indicated by the RDAEA pointer, the answer becomes YES in step S449, and the process operation proceeds to step S451.

Figure 7A:
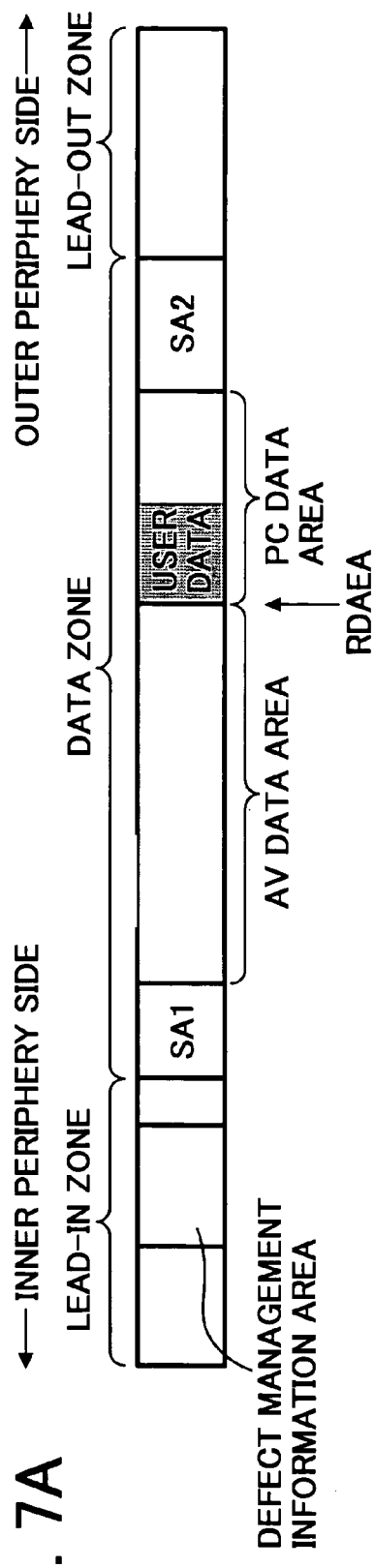
FIGS. 7A and 7B are diagrams of the recording area of the optical disk for explaining a recording process according to the embodiment of the present invention.

In step S451, the CPU 40 determines whether the designated area is a defective area by referring to the replacement list. If the answer is NO in step S451, the process operation proceeds to step S455. In step S455, the writing data is recorded in the designated area. As shown in FIG. 7A, for example, the writing data (user data) is recorded in the PC data area.

Next, in step S459, the verification process is performed on the designated area in which the writing data is recorded. Then, in step S461 in FIG. 5D, the CPU 40 determines whether a defect is detected in the designated area based on the result of the verification process. If defect is detected in step S461 (i.e., the answer is YES in step S461), the writing data is recorded in a predetermined replacement area in step S463.

Next, in step S465, the defect management information is updated. That is, information with respect to the detected defect is added to the replacement list. Then, the CPU 40 determines whether all the user data is recorded in step S467. If there is non-recorded user data, the answer becomes NO in step S467, and the process operation proceeds to step S469.

In step S469, the CPU 40 sets next block data of the data to be recorded as writing data, and the process operation returns to step S447.

If defect is not detected in step S461 (i.e., the answer is NO in step S461), the process operation proceeds to step S467.

Further, if the designated area is a defective area in step S451, the answer becomes YES in step S451, and the process operation proceeds to step S453. In step S453, the CPU 40 causes the writing data to be recorded in a designated replacement area by referring to the replacement list. Then, the process operation proceeds to step S459.

Figure 7B:
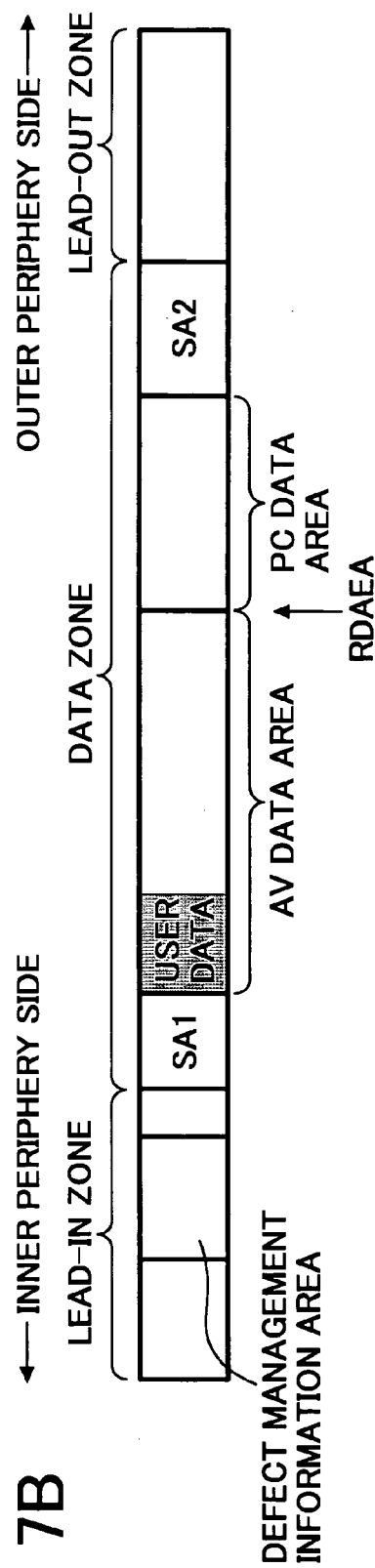

Further, if the designated area is not included in the defect management area in step S449, the answer becomes NO in step S449, and the process operation proceeds to step S457. In step S457, the writing data is recorded in the designated area. As shown in FIG. 7B, for example, the writing data (user data) is recorded in the AV data area. Then, the process operation proceeds to step S467, and the verification process is not performed.

Until the answer in step S467 becomes YES, the loop process of steps S447 through S469 is repeated. When all the user data is recorded (i.e., the answer is YES in step S467), the CPU 40 resets the recording request flag to "0", and the process operation proceeds to step S487.

In step S487, the CPU 40 resumes the background formatting process by referring to the "Disk status". Then, the process operation returns to step S409.

If the recording request flag is set to "0" in step S443, the answer becomes NO in step S443, and the CPU 40 selects a "reproduction requested area" from which a user requests to reproduce the user data based on a reproduction sort address and a reproduction data length included in the reproduction request command in step S471.

Then, in step S473, the CPU 40 sets the first reproduction block in the reproduction requested area as a reproduction target area from which the user data is reproduced.

Next, in step S475, the CPU 40 determines whether the reproduction target area is included in the defect management area by referring to the RDAEA pointer. Specifically, the CPU 40 compares the address of the reproduction target area with an address indicated by the RDAEA pointer. If the address of the reproduction target area is greater than the address indicated by the RDAEA pointer, the answer becomes YES in step S475, and the process operation proceeds to step S477.

In step S477, the CPU 40 determines whether the reproduction target area is a defective area by referring to the replacement list. If the answer is NO in step S477, the process operation proceeds to step S481. In step S481, the user data is reproduced from the reproduction target area.

Then, the CPU 40 determines whether the user data is reproduced from all the reproduction requested area in step S483. If a reproduction requested area is not reproduced, the answer becomes NO in step S483, and the process operation proceeds to step S485.

In step S485, the CPU 40 sets a next reproduction block in the reproduction requested area as a reproduction target area, and the process operation returns to step S475.

If the reproduction target area is a defective area in step S477, the answer in step S477 becomes YES, and the process operation proceeds to step S479. In step S479, the CPU 40 causes the user data to be reproduced from a designated replacement area by referring to the replacement list. Then, the process operation proceeds to step S483.

Further, if the reproduction target area is not included in the defect management area in step S475, the answer becomes NO in step S475, and the process operation proceeds to step S481.

Until the answer in step S483 becomes YE, the loop process of steps S475 through S485 is repeated. When the user data is reproduced from all the reproduction requested area in step S483, the CPU 40 resets the reproduction request flag to "0", and the process operation proceeds to step S487.

In the above-described process operation, the background formatting process is performed during a period when the recording request command and the reproduction request command are not received from the host apparatus 90. If the background formatting process is completed in step S409 (i.e., the answer is YES in step S409), a predetermined end process is performed, and the process operation executed in response to receiving the formatting command is ended, that is, the formatting of the optical disk 15 is completed. If the replacement list is updated, the updated replacement list is recorded on the optical disk 15 in this end process.

Figure 5D:
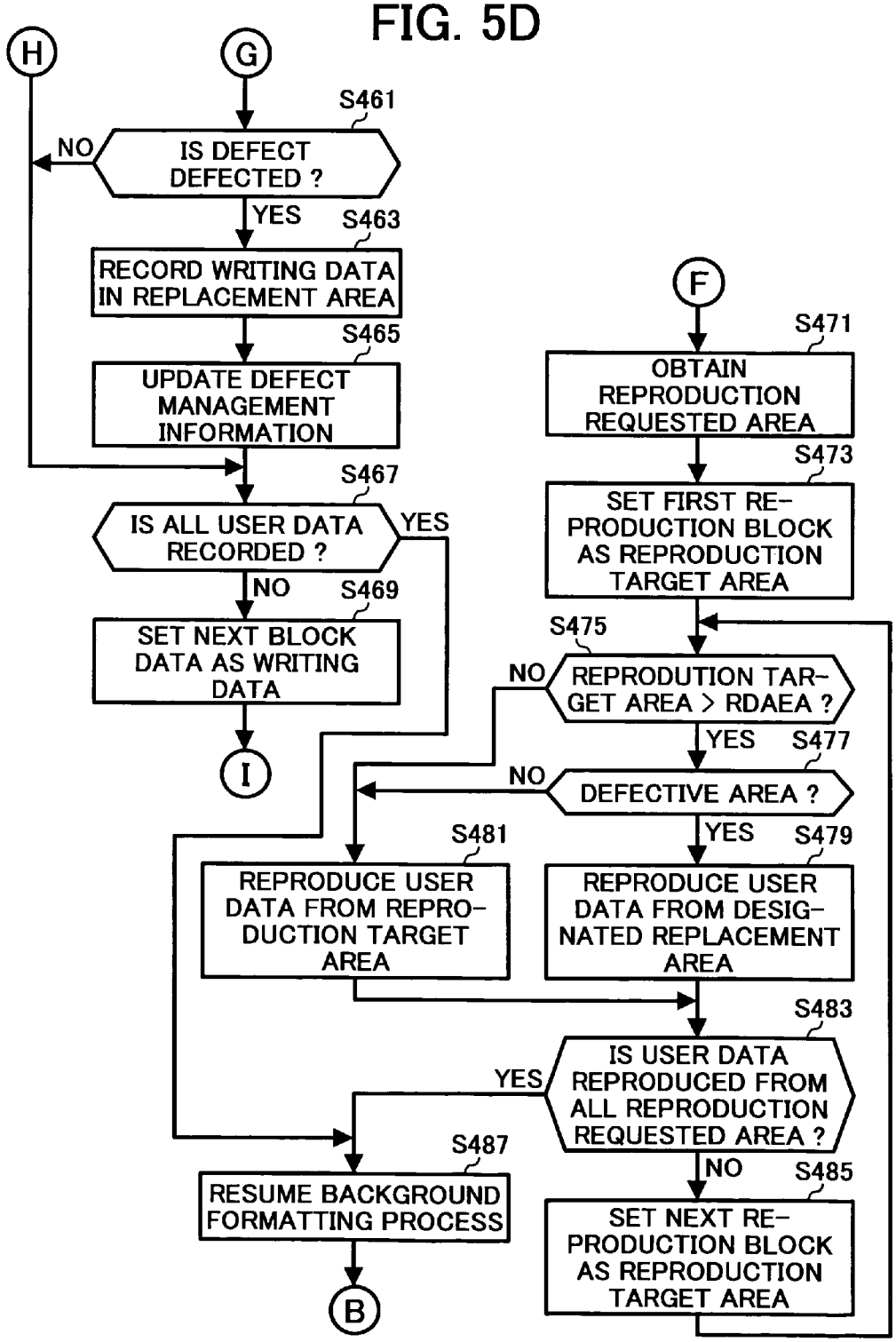

If the recording request command is received from the host apparatus 90 after the background formatting process is completed, a program that executes the same process as the recording process of steps S445 through S469 in FIGS. 5C and 5D is started, and thereby user data is recorded on the optical disk 15 similarly as in the above-described recording process.

If the reproduction request command is received from the host apparatus 90 after the background formatting process is completed, a program that executes the same process as the reproduction process of steps S471 through S485 in FIG. 5D is started, and thereby user data recorded on the optical disk 15 is reproduced similarly as in the above-described reproduction process.

As described above, by employing the CPU 40 and by executing the program with the CPU 40, the optical disk apparatus 20 of the present embodiment provides a setting mechanism, a determining mechanism, and a replacement mechanism. Specifically, the setting mechanism is achieved by executing process operation step S403 in FIG. 5A, and the determining mechanism is achieved by executing process operation steps S423 through S427 and S435 and S437 in FIG. 5B, and S449 in FIG. 5C. Further, the replacement mechanism is achieved by executing process operation steps S459 through S463 in FIGS. 5C and 5D. Further, a recording mechanism is provided by employing the optical pickup unit 23, the laser control circuit 24, the encoder 25, and the CPU 40 and by executing the program with the CPU 40.

According to the above-described embodiment, in the optical disk apparatus 20 of the present embodiment, when a formatting command to format the blank optical disk 15 is received, the pointer indicating information with respect to a specific area, that is, the replacement disabled area end address (RDAEA), is set to the RDAEA pointer in the defect management information, and the defect management information is initialized. By setting the boundary between the AV data area and the PC data area, that is, the last address of the AV data area, as the information with respect to the RDAEA, the AV data area becomes a specific area in which a defect detection process need not be performed. Because defect management is not performed in the AV data area, information can be consecutively recorded in the AV data area, so that the continuity of AV data can be achieved. In contrast, because defect management is performed in the PC data area, the reliability of data recorded in the PC data area can be ensured. Thus, plural types of data for different uses can be properly recorded on the same information recording medium.

In this embodiment, because the RDAEA pointer is stored in the optical disk 15, even if the optical disk 15 is used in a different optical disk apparatus, the continuity of data recorded in the AV data area can be achieved, and the reliability of data recorded in the PC data area can be ensured.

Further, as a user can arbitrarily set the RDAEA, the convenience of user is enhanced.

Next, a process operation according to another embodiment will be described referring to FIGS. 8A through 8D. In the process operation of this embodiment, a method of setting information with respect to a specific area in which a verification process need not be performed is different from the process operation of the above-described embodiment. Therefore, a part of a program stored in the flash memory 39 and executed in this embodiment is different from the program executed in the above-described embodiment. The configuration of the optical disk apparatus of this embodiment is similar to that of the optical disk apparatus 20 shown in FIG. 1. Further, the disk layout of the recording area of the optical disk 15 used in this embodiment is the same as that of the optical disk 15 used in the above-described embodiment. Because the RDAEA information is not used in this embodiment, the "Replacement disabled area end address (RDAEA) pointer" in the data structure of defect management information shown in FIG. 4B may be replaced with "Reserved".

The process operation executed in response to receiving a formatting command requesting formatting of a blank optical disk from the host apparatus 90 by the optical disk apparatus 20 will be described referring to FIGS. 8A through 8D. The preconditions are similar to those in the above-described embodiment. The process operation steps shown in these flowcharts correspond to a sequence of process algorithms of a process program executed by the CPU 40. Upon receiving a formatting command to format a blank disk from the host apparatus 90, a leading address of a process program corresponding to the flowcharts of FIGS. 8A through 8D is set to a program counter of the CPU 40, and the process operation starts.

Figure 8A:
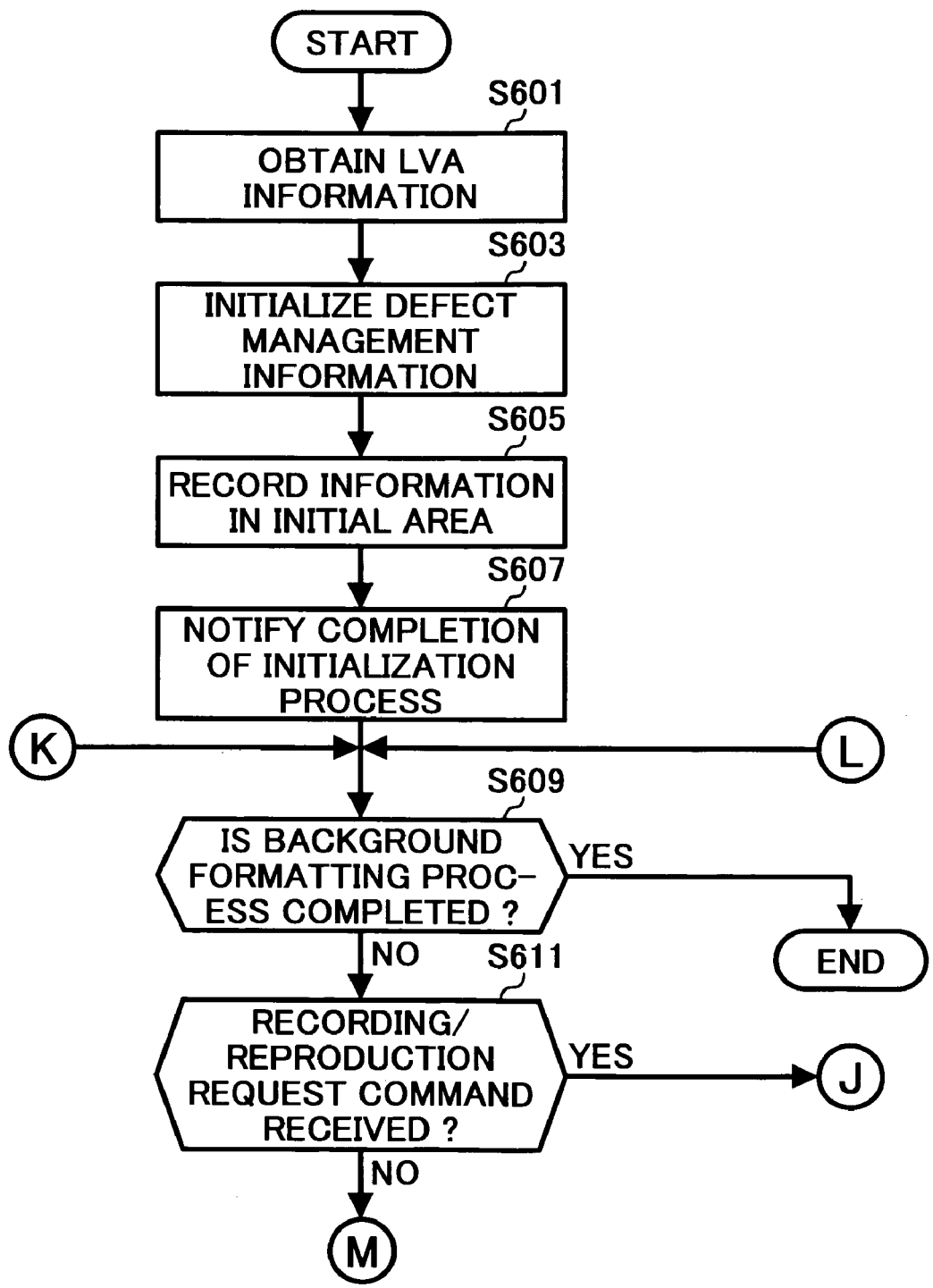
FIGS. 8A through 8D are flowcharts of process operation steps of the CPU according to another embodiment of the present invention, which is performed upon receiving a formatting command requesting formatting of the optical disk from a host apparatus.
Figure 8B:
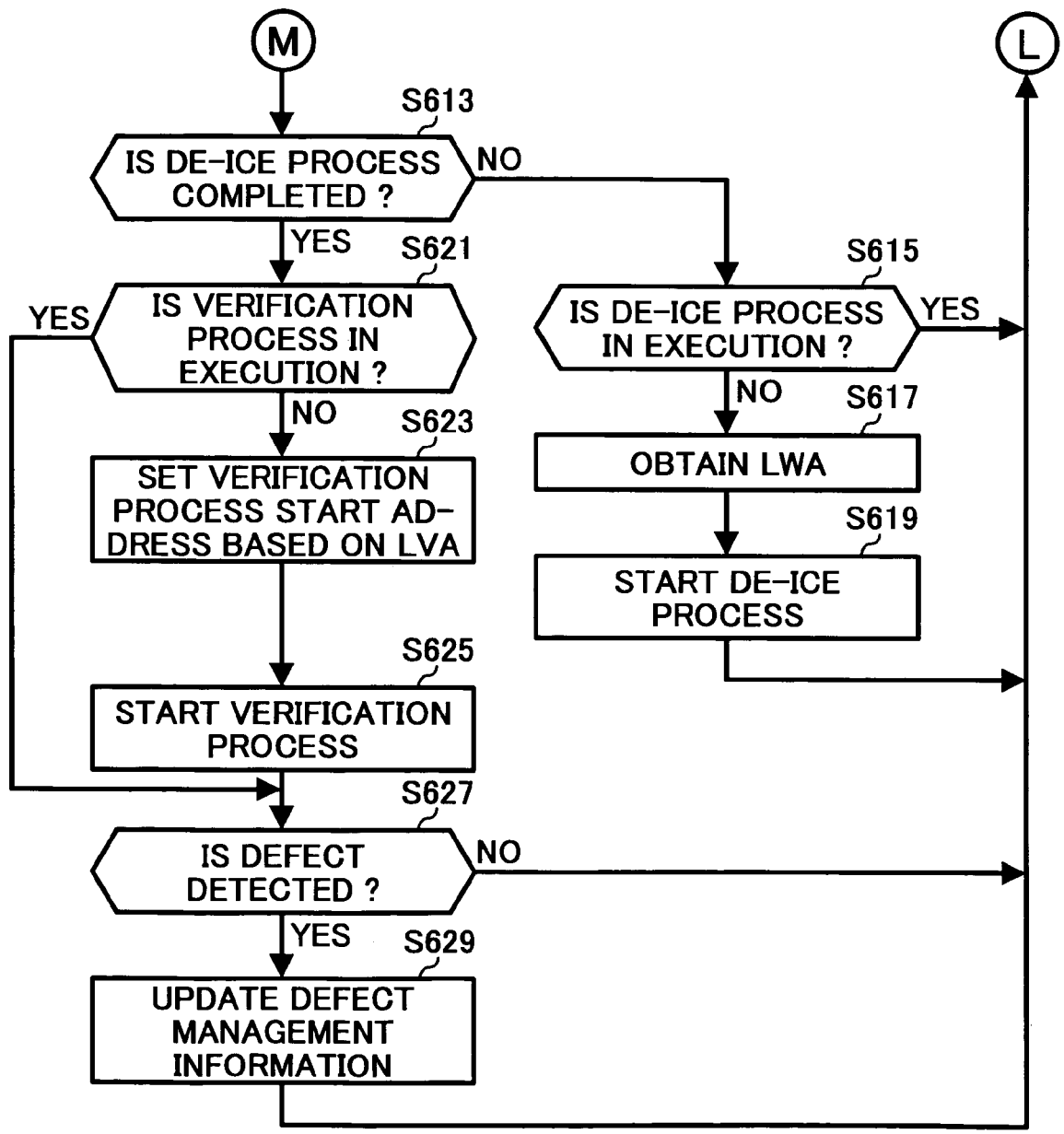

In step S601 of FIG. 8A, the CPU 40 obtains information with respect to the Last verified address (LVA) set by a user through the host apparatus 90. Here, as a non-limiting example, the boundary between the AV data area and the PC data area has been set by a user as the information with respect to the LVA. Therefore, as shown in FIG. 9A, the last address of the AV data area is obtained as the LVA.

Next, in step S603, the CPU 40 sets a pointer indicating the LVA obtained in step S601 to the LVA pointer (FIG. 4B) in the defect management information, and initializes the defect management information. The initialized defect management information is stored in a predetermined area reserved in the RAM 41. As shown in FIG. 9A, the last address of the AV data area is set as the LVA. Therefore, the defect detection process for the SA1 and the AV data area is regarded as having been already completed.

Then, the process operation similar to the above-described process operation performed in steps S405 and S407 is performed in steps S605 and S607.

Next, the CPU 40 refers to the "Disk status" and determines whether a background formatting process is completed in step S609. Because a background formatting process is not completed, the answer in step S609 becomes NO. Then, the CPU 40 determines whether a recording request command or a reproduction request command has been received from the host apparatus 90by referring to the recording request flag and the reproduction request flag in step S611. If each of the recording request flag and the reproduction request flag is set to "0", the answer in step S611 becomes NO, and the process operation proceeds to step S613 in FIG. 8B.

Next, in step S613, the CPU 40 determines whether a de-ice process is completed by referring to a formatting status included in the "Disk status". Because the de-ice process has not yet been performed, the answer in step S613 becomes NO, and the process operation proceeds to step S615.

In step S615, the CPU 40 determines whether the de-ice process is in execution. Because the de-ice process has not yet been started, the answer in step S615 becomes NO. Then, the CPU 40 obtains a Last Written address (LWA) in step S617.

Next, in steps S617 and S619, the process operation similar to steps S417 and S419 is performed. Then, the process operation returns to step S609.

If the de-ice process is in execution in step S615 (i.e., the answer is YES in step S615), the process operation returns to step S609. Until the answer in step S611 and the answer in step S613 become YES, the de-ice process is continued.

When the de-ice process is completed in step S613 (i.e., the answer is YES in step S613), the CPU 40 determines whether a verification process is in execution in step S621. Because the verification process has not yet been started, the answer in step S621 becomes NO.

Next, in step S623, the CPU 40 obtains a Last verified address (LVA), and sets an address that follows the obtained LVA as a verification start address. As shown in FIG. 9B, for example, the verification process is started from the leading address of the PC data area. Accordingly, the verification process is not performed in the SA1 and the AV data area.

Next, the CPU 40 starts the verification process in step S625. Then, in step S627, the CPU 40 determines whether a defect is detected based on the result of the verification process. If defect is not detected in step S627 (i.e., the answer is NO in step S627), the process operation returns to step S609. If defect is detected in step S627 (i.e., the answer is YES in step S627), the process operation proceeds to step S629.

Next, in step S629, the CPU 40 adds the information with respect to the defect detected in step S627 to the replacement list (FIG. 4B), and updates the defect management information. Then, the process operation returns to step S609. During the execution of the verification process, the answer in step S621 becomes YES, and the process operation proceeds to step S627.

Until the answer in step S609 or step S611 becomes YES, each verification process in the PC data area and the SA2 is continued.

Figure 8C:
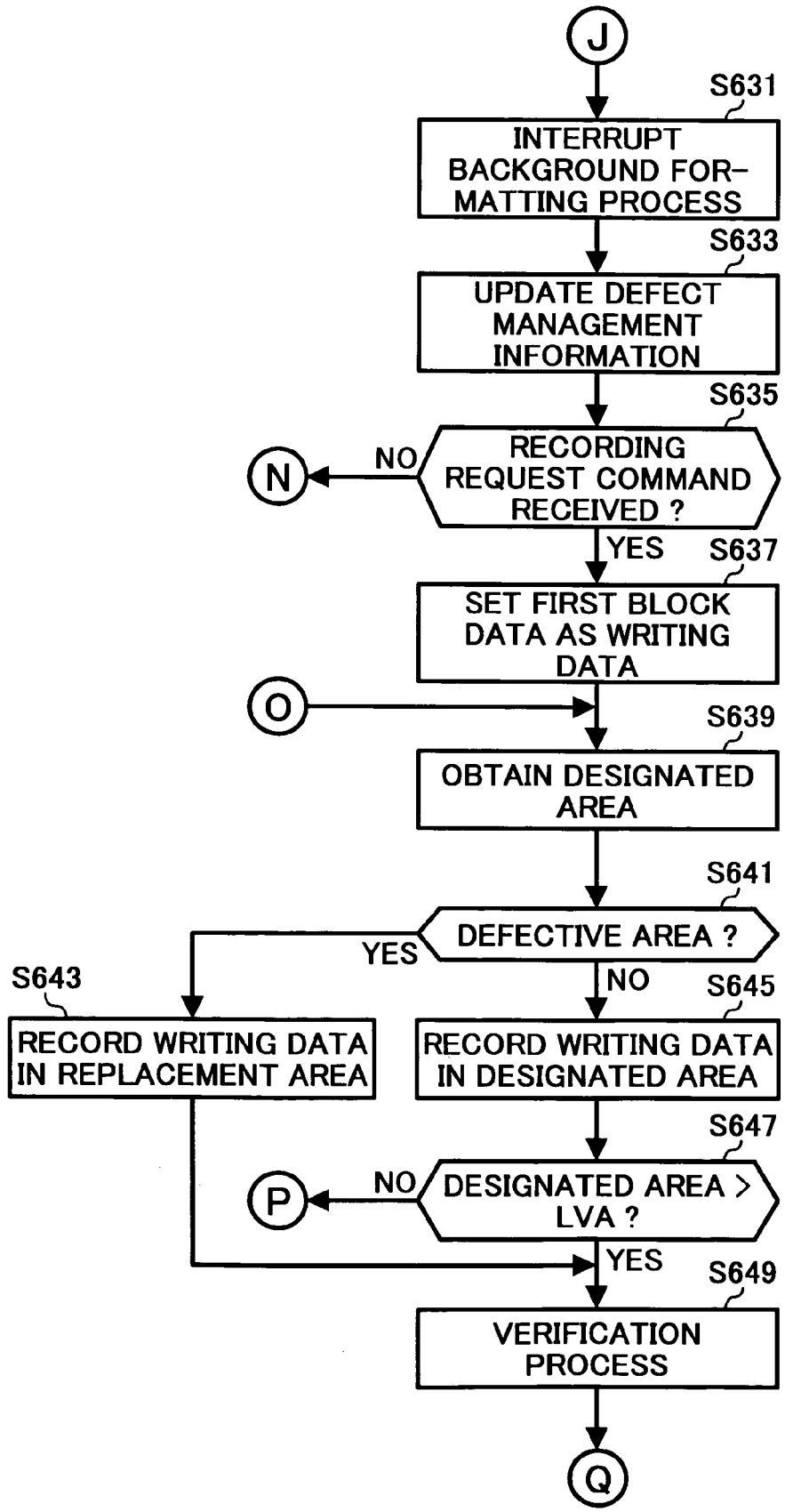

If at least one of the recording request flag and the reproduction request flag is set to "1" in step S611, the answer becomes YES in step S611, and the process operation proceeds to step S631 in FIG. 8C.

In steps S631 and S633, the process operation similar to steps S439 and S441 in FIG. 5C is performed.

In step S635, the CPU 40 determines whether a recording request command has been received from the host apparatus 90 by referring to the recording request flag. If the recording request flag is set to "1", the answer becomes YES in step S635, and the process operation proceeds to step S637.

In steps S637 and S639, the process operation similar to steps S445 and S447 in FIG. 5C is performed.

Figure 9C:
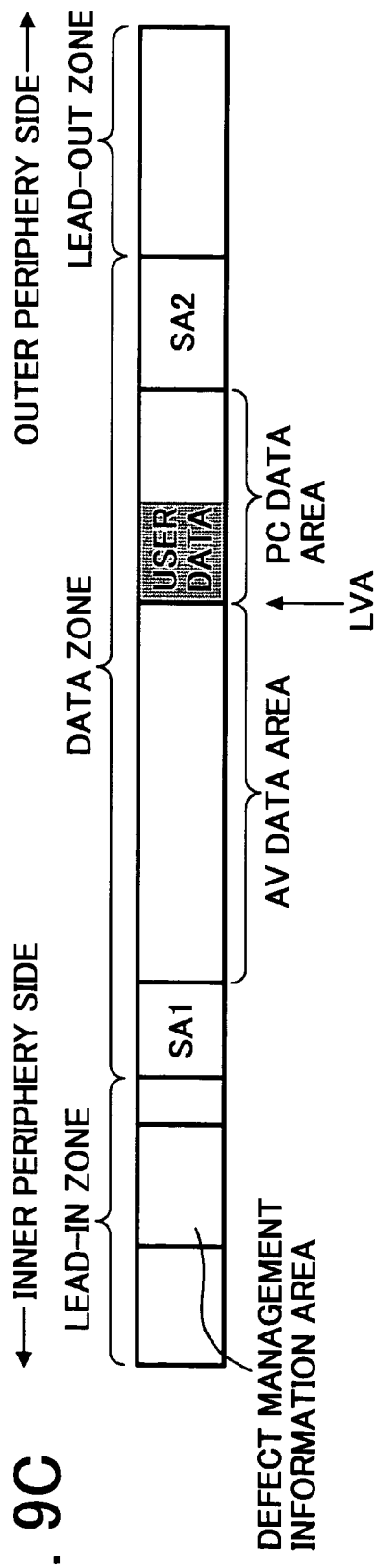
FIGS. 9C and 9D are diagrams of the recording area of the optical disk for explaining a recording process according to the another embodiment of the present invention.
Figure 9D:
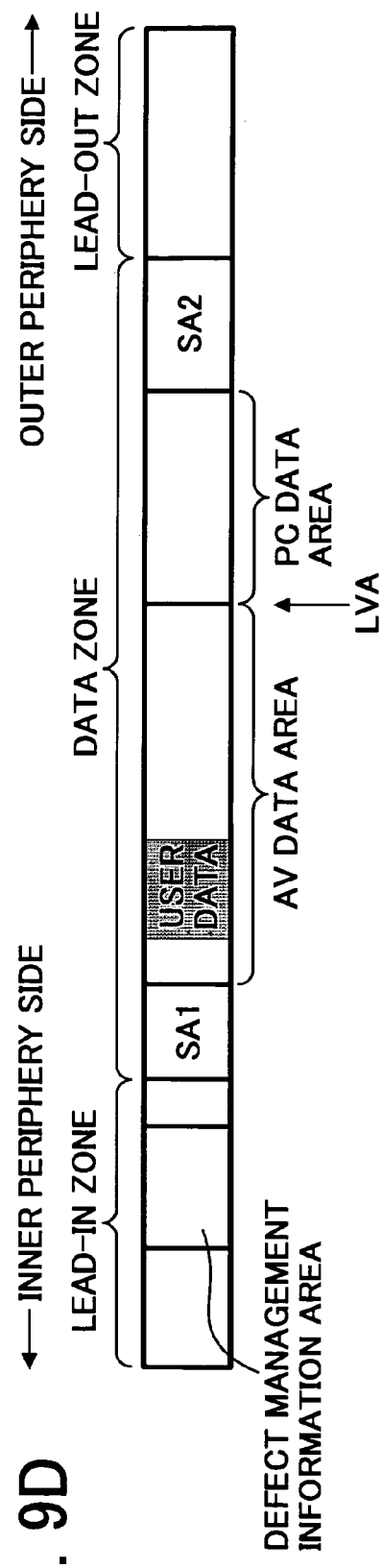

In step S641, the CPU 40 determines whether the designated area is a defective area by referring to the replacement list. If the answer is NO in step S641, the process operation proceeds to step S645. In step S645, the writing data is recorded in the designated area. As shown in FIGS. 9C and 9D, for example, the writing data (user data) is recorded in the PC data area (FIG. 9C) and the AV data area (FIG. 9D).

Next, in step S647, the CPU 40 determines whether the designated area is included in an area in which a verification process has not yet been performed by referring to the LVA pointer. Specifically, the CPU 40 compares the address of the designated area with an address indicated by the LVA pointer. If the address of the designated area is greater than the address indicated by the LVA pointer, the answer becomes YES in step S647, and the process operation proceeds to step S649.

Next, in step S649, the verification process is performed on the designated area in which the writing data is recorded. Then, in step S651 in FIG. 8D, the CPU 40 determines whether a defect is detected in the designated area based on the result of the verification process. If a defect is detected in step S651 (i.e., the answer is YES in step S651), the process operation proceeds to step S653.

In steps S653 and S655, the process operation similar to steps S463 and S465 in FIG. 5D is performed.

Then, the CPU 40 determines whether all the user data is recorded in step S657. If there is non-recorded user data, the answer becomes NO in step S657, and the process operation proceeds to step S659.

In step S659, the CPU 40 sets next block data of the data to be recorded as writing data, and the process operation returns to step S639.

If a defect is not detected in step S651 (i.e., the answer is NO in step S651), the process operation proceeds to step S657.

Further, if the designated area is included in the AV data area as shown in FIG. 9D, because the address of the designated area is less than the LVA, the answer becomes NO in step S647, and the process operation proceeds to step S657. That is, the verification process is not performed in the designated area.

Further, if the designated area is a defective area in step S641, the answer becomes YES in step S641, and the process operation proceeds to step S643. In step S643, the CPU 40 causes the writing data to be recorded in a designated replacement area by referring to the replacement list. Then, the process operation proceeds to step S649.

Until the answer in step S657 becomes YES, the loop process of steps S639 through S659 is repeated. When all the user data is recorded (i.e., the answer is YES in step S657), the CPU 40 resets the recording request flag to "0", and the process operation proceeds to step S675.

In step S675, the CPU 40 resumes the background formatting process by referring to the "Disk status". Then, the process operation returns to step S609.

If the recording request flag is set to "0" in step S635, the answer becomes NO in step S635, and the process operation proceeds to step S661.

In steps S661 and S663, the process operation similar to steps S471 and S473 in FIG. 5D is performed.

Next, in step S665, the CPU 40 determines whether the reproduction target area is a defective area by referring to the replacement list. If the answer is NO in step S665, the process operation proceeds to step S669. In step S669, the user data is reproduced from a reproduction target area.

Then, the CPU 40 determines whether the user data is reproduced from all the reproduction requested area in step S671. If a reproduction requested area is not reproduced, the answer becomes NO in step S671, and the process operation proceeds to step S673.

In step S673, the CPU 40 sets a next reproduction block in the reproduction requested area as a reproduction target area, and the process operation returns to step S665.

If the reproduction target area is a defective area in step S665, the answer in step S665 becomes YES, and the process operation proceeds to step S667. In step S667, the CPU 40 causes the user data to be reproduced from a designated replacement area by referring to the replacement list. Then, the process operation proceeds to step S671.

Until the answer in step S671 becomes YES, the loop process of steps S665 through S673 is repeated. When the user data is reproduced from all the reproduction requested area in step S671, the CPU 40 resets the reproduction request flag to "0", and the process operation proceeds to step S675.

In the above-described process operation, the background formatting process is performed during a period when the recording request command and the reproduction request command are not received from the host apparatus 90. If the background formatting process is completed in step S609 (i.e., the answer is YES in step S609), a predetermined end process is performed, and the process operation executed in response to receiving the formatting command is ended, that is, the formatting of the optical disk 15 is completed. If the replacement list is updated, the updated replacement list is recorded on the optical disk 15 in this end process.

Figure 8D:
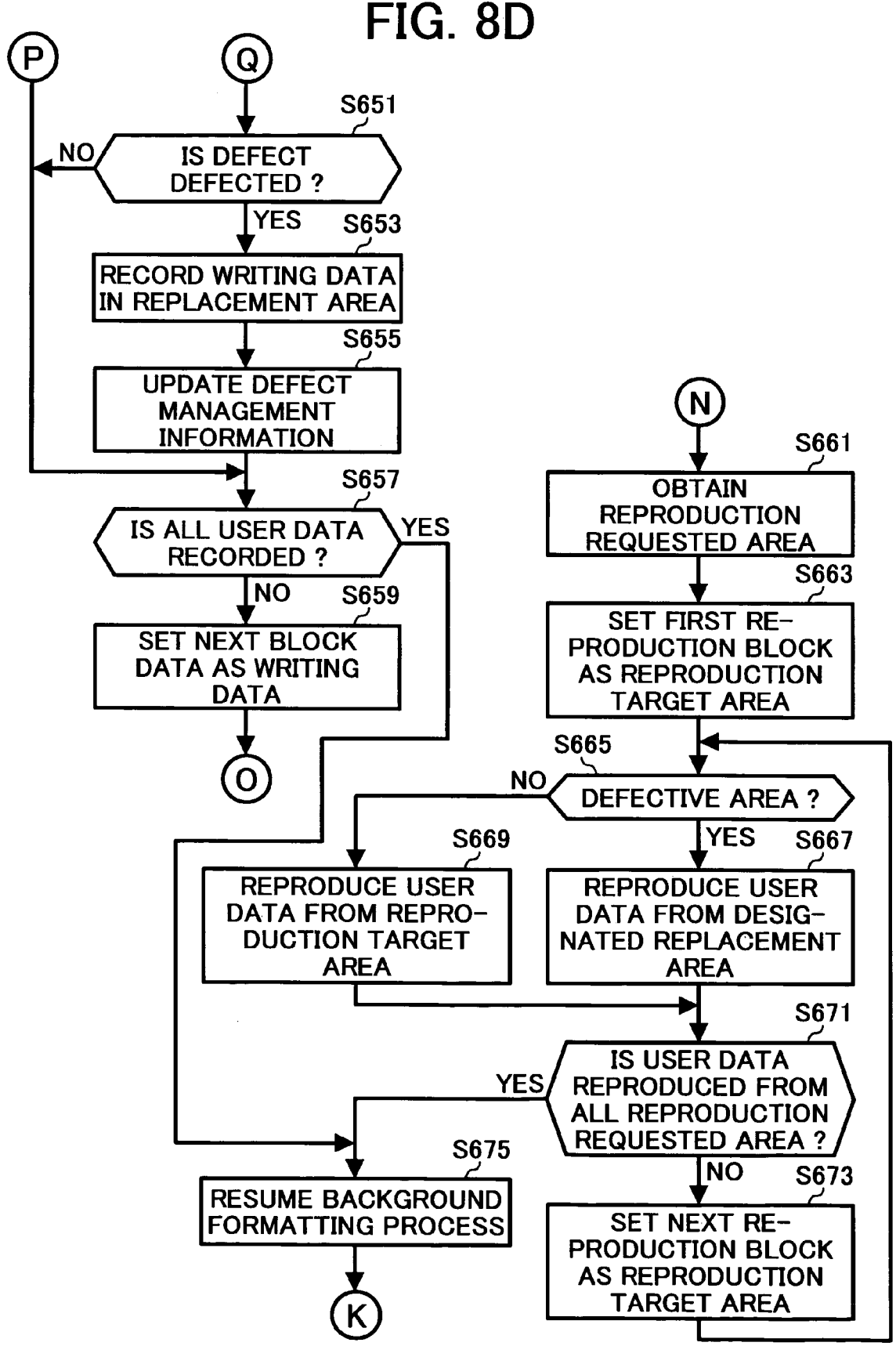

If the recording request command is received from the host apparatus 90 after the background formatting process is completed, a program that executes the same process as the recording process of steps S637 through S659 in FIGS. 8C and 8D is started, and thereby user data is recorded on the optical disk 15 similarly as in the above-described recording process.

If the reproduction request command is received from the host apparatus 90 after the background formatting process is completed, a program that executes the same process as the reproduction process of steps S661 through S673 in FIG. 8D is started, and thereby user data recorded on the optical disk 15 is reproduced similarly as in the above-described reproduction process.

As described above, by employing the CPU 40 and by executing the program with the CPU 40, the optical disk apparatus 20 of the present embodiment provides a setting mechanism, a determining mechanism, and a replacement mechanism. Specifically, the setting mechanism is achieved by executing process operation step S603 in FIG. 8A, and the determining mechanism is achieved by executing process operation step S623 in FIG. 8B, and S647 in FIG. 8C. Further, the replacement mechanism is achieved by executing process operation steps S649 through S653 in FIGS. 8C and 8D. Further, a recording mechanism is provided by employing the optical pickup unit 23, the laser control circuit 24, the encoder 25, and the CPU 40 and by executing the program with the CPU 40.

According to the above-described embodiment, in the optical disk apparatus 20 of the present embodiment, when a formatting command to format the blank optical disk 15 is received, the last address of the AV data area is set to the last verified address (LVA) as dummy information indicating that the execution of the verification process in the SA1 and the AV data area has been already completed. Therefore, the AV data area is regarded as not including a defective area, so that defect management is not performed in the AV data area. Thereby, information can be consecutively recorded in the AV data area, so that the continuity of AV data can be achieved. In contrast, because defect management is performed in the PC data area, the reliability of data recorded in the PC data area can be ensued. Thus, plural types of data for different uses can be properly recorded on the same information recording medium.

In this embodiment, because the LVA pointer is stored in the optical disk 15, even if the optical disk 15 is used in a different optical disk apparatus, the continuity of data recorded in the AV data area can be achieved, and the reliability of data recorded in the PC data area can be ensured.

Further, as a user can arbitrarily set the initial value of the LVA, the convenience of user is enhanced.

The present invention has been described with respect to the exemplary embodiments illustrated in the figures. However, the present invention is not limited to these embodiments and may be practiced otherwise.

In the above-described embodiments, the computer program is stored in the flash memory 39. Alternatively, the computer program may be stored in other recording media such as a compact disk (CD), an optical magnetic disk, a digital versatile disk (DVD), a memory card, a universal serial bus (USB) memory, floppy disk, or any other suitable recording media. In the case of storing the computer program in such other recording media, the computer program may be loaded to the flash memory 39 via a reproduction device or an interface which corresponds to each of the recording media. Further, the computer program may be transferred to the flash memory 39 via a network such as a local-area network (LAN), an intranet, and the Internet. Any other method may be employed so long as the computer program can be loaded to the flash memory 39 or other suitable memory.

Although the optical disk 15 has been described as a DVD in the above embodiments, the optical disk 15 is not necessarily a DVD, but may be a CD or a next-generation information recording medium made for a laser light beam with a wavelength of about 405 nm.

Although the optical pickup unit 23 of the present embodiments includes a single semiconductor laser, plural semiconductor lasers that emit laser light beams with different wavelengths may also be employed. For example, the plural semiconductor lasers may include at least one of a semiconductor laser that emits a laser light beam with a wavelength of about 405 nm, a semiconductor laser that emits a laser light beam with a wavelength of about 660 nm, and a semiconductor laser that emits a laser light beam with a wavelength of about 780 nm. That is, the optical disk apparatus 20 may be adapted to plural kinds of optical disks each conforming to the standards different with one another.

Numerous additional modifications and variations of the present invention are possible in light of the above teachings. It is therefore understood that within the scope of the appended claims, the present invention may be practiced other than as specifically described herein.

What is claimed:

1. A method of setting defect management information used for managing a defective area in a recording area of an information recording medium, the method comprising steps of: obtaining information with respect to a specific area in the recording area in which a defect detection process for detecting the defective area in the recording area need not be performed; setting defect management information including the information with respect to the specific area, wherein the information with respect to the specific area is set by a user; determining whether to perform the defect detection process in the specific area based on the defect management information; and recording information in the specific area after determining a defect detection process need not be performed, wherein the specific area is adjacent to a defect management area in the recording area in which the defect detection process needs to be performed and the information with respect to the specific area includes information with respect to a boundary between the specific area and the defect management area.

2. The method according to claim 1, wherein the information with respect to the specific area includes dummy information indicating that execution of the defect detection process in the specific area is completed.

3. The method according to claim 2, wherein the defect management information includes information with respect to an area in which execution of the defect detection process is completed, and the dummy information is recorded in an area for storing the information with respect to an area in which execution of the defect detection process is completed in a defect management information area of the information recording medium.

4. The method according to claim 1, wherein the defect detection process includes a verification process that detects whether data is properly recorded in the recording area by reproducing the data from the recording area.

5. The method according to claim 1, wherein at least one of audio data and visual data is recorded in the specific area.

6. The method according to claim 1, wherein the setting step comprises setting the defect management information when the information recording medium is initialized.

7. A method of recording data in a recording area of an information recording medium, comprising steps of: obtaining information with respect to the type of data to be recorded in a specific area in the recording area in which a defect detection process for detecting a defective area in the recording area need not be performed; setting defect management information that is used for managing the defective area in the recording area based on the information with respect to the type of data to be recorded in the specific area in the recording area; recording the defect management information in a defect management information area of the information recording medium adjacent to the specific area, wherein the defect management information includes information with respect to a boundary between the specific area and the defect management area, obtaining information with respect to a recording target area in the recording area in which data is recorded; and determining whether to perform the defect detection process in the recording target area based on the defect management information and the information with respect to the recording target area, wherein the information with respect to the boundary between the specific area and the defect management area is set by a user.

8. The method according to claim 7, wherein the determining step further comprises determining not to perform the defect detection process in the recording target area when execution of the defect detection process is determined to be completed in the recording target area based on the information with respect to the specific area.

9. The method according to claim 7, further comprising:
performing the defect detection process to determine whether a defective area is included in the recording target area when a determination is made in the determining step to perform the defect detection process; and
recording data recorded in the defective area in a predetermined replacement area when the recording target area includes the defective area.

10. A computer-readable medium containing instructions for an information recording apparatus that records data in a recording area of an information recording medium to carry out a method comprising steps of: obtaining information with respect to a specific area in the recording area in which a defect detection process for detecting a defective area in the recording area need not be performed; setting defect management information that is used for managing the defective area in the recording area and that includes the information with respect to the specific area, wherein the information with respect to the specific area is set by a user; recording the defect management information in a defect management information area of the information recording medium adjacent to the specific area, wherein the defect management information includes information with respect to a boundary between the specific area and the defect management area; determining whether to perform the defect detection process in the specific area based on the defect management information; and recording information in the specific area after determining a defect detection process need not be performed.

11. The computer-readable medium according to claim 10, wherein the method further comprises:
obtaining information with respect to a recording target area in the recording area in which data is recorded; and
determining whether to perform the defect detection process in the recording target area based on the defect management information and the information with respect to the recording target area.

12. The computer-readable medium according to claim 11, wherein the method further comprises:
performing the defect detection process to determine whether a defective area is included in the recording target area when a determination is made in the determining step to perform the defect detection process; and
recording data recorded in the defective area in a predetermined replacement area when the recording target area includes the defective area.

13. A computer readable storage medium storing a computer program for controlling an information recording apparatus that records data in a recording area of an information recording medium to carry out a method comprising steps of:
obtaining information with respect to the type of data to be recorded in a specific area in the recording area in which a defect detection process for detecting a defective area in the recording area need not be performed;
setting defect management information that is used for managing the defective area in the recording area based on the information with respect to the type of data to be recorded in the specific area in the recording area;
recording the defect management information in a defect management information area of the information recording medium adjacent to the specific area, wherein the defect management information includes information with respect to a boundary between the specific area and the defect management area; and
determining whether to perform the defect detection process in the specific area based on the defect management information,
wherein the information with respect to the boundary between the specific area and the defect management area is set by a user.

14. The computer readable storage medium according to claim 13, wherein the method further comprises:
obtaining information with respect to a recording target area in the recording area in which data is recorded; and
determining whether to perform the defect detection process in the recording target area based on the defect management information and the information with respect to the recording target area.

15. The computer readable storage medium according to claim 14, wherein the method further comprises:
performing the defect detection process to determine whether a defective area is included in the recording target area when a determination is made in the determining step to perform the defect detection process; and
recording data recorded in the defective area in a predetermined replacement area when the recording target area includes the defective area.

16. An information recording apparatus that records information on an information recording medium, comprising:
a setting mechanism configured to set defect management information including information with respect to a specific area in a recording area of the information recording medium in which a defect detection process for detecting a defective area in the recording area need not be performed based at least in part on the type of data to be recorded in the specific area of the recording area, wherein the information with respect to the specific area is set by a user;
a recording mechanism configured to:
record data in the recording area, including in at least one specific area of the recording area in which the defect detection process need not be performed; and
record the defect management information in a defect management information area of the information recording medium adjacent to the specific area, wherein the defect management information includes information with respect to a boundary between the specific area and the defect management area; and
a determining mechanism configured to determine whether to perform the defect detection process in a recording target area in the recording area in which the data is recorded, based on the defect management information and information with respect to the recording target area.

17. The information recording apparatus according to claim 16, wherein the setting mechanism is configured to set the defect management information when the information recording medium is initialized.

18. The information recording apparatus according to claim 16, wherein the information recording medium is in a disk shape, and the specific area is provided at an inner periphery side of a defect management area in the recording area in which the defect detection process needs to be performed.

19. The information recording apparatus according to claim 16, wherein the information with respect to the specific area includes dummy information indicating that execution of the defect detection process in the specific area is completed.

20. The information recording apparatus according to claim 19, wherein the defect management information includes information with respect to an area in which execution of the defect detection process is completed, and the recording mechanism is configured to record the dummy information in an area for storing the information with respect to an area in which execution of the defect detection process is completed in a defect management information area of the information recording medium.

21. The information recording apparatus according to claim 19, wherein the determining mechanism determines not to perform the defect detection process in the recording target area when execution of the defect detection process is determined to be completed in the recording target area based on the information with respect to the specific area.

22. The information recording apparatus according to claim 16, further comprising:
a replacement mechanism configured to perform the defect detection process to determine whether a defective area is included in the recording target area when the determining mechanism determines to perform the defect detection process, and configured to record data recorded in the defective area in a predetermined replacement area when the recording target area includes the defective area.

23. The information recording apparatus according to claim 16, wherein the defect detection process includes a verification process that detects whether data is properly recorded in the recording area by reproducing the data from the recording area.

24. The information recording apparatus according to claim 16, wherein at least one of audio data and visual data is recorded in the specific area.

25. The information recording apparatus according to claim 16, wherein the recording mechanism is configured to record dummy data and user data in the recording area.

26. The method according to claim 1, wherein the specific area contains audiovisual data and the defect management area contains computer data.

27. The method according to claim 26, wherein the audiovisual data and the computer data are recorded in adjacent sectors of the recording area, and the defect detection process is performed on the sectors containing the computer data but not on the sectors containing the audiovisual data.

* * * * *